(12) United States Patent
Lu

(10) Patent No.: US 12,703,109 B2
(45) Date of Patent: Aug. 11, 2026

(54) QUICK CHANGE INTERFACE FOR JOINT OF ROBOTIC ARM AND ROBOTIC ARM

(71) Applicant: WUHAN UNITED IMAGING SURGICAL CO., LTD., Wuhan (CN)

(72) Inventor: Zhuangzhuang Lu, Wuhan (CN)

(73) Assignee: WUHAN UNITED IMAGING SURGICAL CO., LTD., Wuhan (CN)

( * ) Notice: Subject to any disclaimer, the term of this patent is extended or adjusted under 35 U.S.C. 154(b) by 450 days.

(21) Appl. No.: 18/319,450

(22) Filed: May 17, 2023

(65) Prior Publication Data

US 2023/0286171 A1 Sep. 14, 2023

Related U.S. Application Data

(63) Continuation of application No. PCT/CN2021/131271, filed on Nov. 17, 2021.

(30) Foreign Application Priority Data

Nov. 17, 2020 (CN) ......................... 202011287515.6
Jun. 30, 2021 (CN) ......................... 202121490789.5

(51) Int. Cl.
*B25J 15/04* (2006.01)

(52) U.S. Cl.
CPC ....... *B25J 15/0425* (2013.01); *B25J 15/0408* (2013.01); *B25J 15/0416* (2013.01)

(58) Field of Classification Search
CPC ..... B25J 15/04; B25J 15/0408; B25J 15/0425
See application file for complete search history.

(56) References Cited

U.S. PATENT DOCUMENTS 5,098,253 A 3/1992 Du et al.
10,047,908 B1 * 8/2018 Bohle, II ............ B25J 15/0466
(Continued)

FOREIGN PATENT DOCUMENTS

CN 201220257 Y 4/2009
CN 202264080 U 6/2012
(Continued)

OTHER PUBLICATIONS

Wikipedia contributors. (Nov. 13, 2020). Cam follower. In Wikipedia, The Free Encyclopedia. Retrieved 21:09, Sep. 25, 2025, from https://en.wikipedia.org/w/index.php?title=Cam_follower&oldid=988514225 (Year: 2020).*
(Continued)

*Primary Examiner* — Joseph Brown
(74) *Attorney, Agent, or Firm* — Poseidon Advanced IP LLC

(57) ABSTRACT

A quick change interface for a joint of a robotic arm and a robotic arm. The quick change interface includes a body side connector, a replacement side connector, and a driving locking device. The driving locking device is movably arranged on the replacement side connector for driving the body side connector to lock or release from the replacement side connector. The driving locking device includes a driving assembly and a locking assembly. The driving assembly includes a cam mechanism, the cam mechanism being rotationally connected to the body side connector. The locking assembly is movably connected to the body side connector, including a locked state and a released state. The cam mechanism abuts against the locking assembly, and a rotation of the cam mechanism may drive the locking assembly to move, so that the locking component switches between the locked state and the released state.

12 Claims, 17 Drawing Sheets

(56) References Cited

U.S. PATENT DOCUMENTS

| | | | | |
|---|---|---|---|---|
| 2009/0322041 | A1 | 12/2009 | Norton | |
| 2010/0059943 | A1 | 3/2010 | Norton et al. | |
| 2010/0062919 | A1 | 3/2010 | Norton et al. | |
| 2012/0252646 | A1* | 10/2012 | Norton | B25J 15/04 483/16 |
| 2019/0191861 | A1 | 6/2019 | Pringle-IV et al. | |
| 2019/0255713 | A1 | 8/2019 | Churchill | |

FOREIGN PATENT DOCUMENTS

| | | | |
|---|---|---|---|
| CN | 202878266 | U | 4/2013 |
| CN | 104551734 | A | 4/2015 |
| CN | 104626156 | A | 5/2015 |
| CN | 206296936 | U | 7/2017 |
| CN | 206536495 | U | 10/2017 |
| CN | 111114452 | A | 5/2020 |
| CN | 111804942 | A | 10/2020 |
| CN | 111872929 | A | 11/2020 |
| CN | 211890894 | U | 11/2020 |
| CN | 112497258 | A | 3/2021 |
| DE | 202013003765 | U1 | 7/2013 |
| JP | 2003117869 | A | 4/2003 |
| JP | 2009012081 | A | 1/2009 |
| WO | 2018204369 | A1 | 11/2018 |

OTHER PUBLICATIONS

Communication Pursuant to Article 94(3) EPC in European Application No. 21893953.6 mailed on Feb. 4, 2025, 7 pages.

International Search Report in PCT/CN2021/131271 mailed on Jan. 30, 2022, 8 pages.

Written Opinion in PCT/CN2021/131271 mailed on Jan. 30, 2022, 12 pages.

First Office Action in Chinese Application No. 202011287515.6 mailed on Oct. 9, 2021, 17 pages.

The Extended European Search Report in European Application No. 21893953.6 mailed on Feb. 29, 2024, 15 pages.

* cited by examiner

QUICK CHANGE INTERFACE FOR JOINT OF ROBOTIC ARM AND ROBOTIC ARM

CROSS-REFERENCE TO RELATED APPLICATION

This application is a Continuation of International Application No. PCT/CN2021/131271, filled on Nov. 17, 2021, which claims priority of Chinese Patent Application No. 202011287515.6 filed on Nov. 17, 2020 and Chinese Patent Application No. 202121490789.5 filed on Jun. 30, 2021, the contents of each of which are entirely incorporated herein by reference.

TECHNICAL FIELD

The present disclosure relates to the technical field of a robotic arm, and in particular to a joint quick change interface of a robotic arm and a robotic arm.

BACKGROUND

As a complex electromechanical system with high precision, multiple input and output, highly nonlinear and strong coupling, the application of a robotic arm in various industries reflects the development level of industrial automation of a country. The use of the robotic arm can greatly relieve a labor intensity of the staff, ensure a production quality, and improve a production efficiency. Especially, the robotic arm can work normally in the occasions of high (low) temperature, high (low) pressure, dusty, flammable and explosive, toxic gas, and radioactivity, which is of great significance.

In an actual working process, tasks performed by the same robotic arm are often diverse, a shape, size, and weight of a target object may vary between different tasks, or a robotic arm cannot achieve a task due to some missing or unmatching function. Therefore, only using a single end effector cannot meet the complex task requirements. The existing solution is to equip the robot arm with different end effectors and tool libraries, so that the end tools can be changed manually or automatically according to different tasks, which greatly improves a universality and flexibility of the robotic arm. To ensure a reliable connection between an end effector and a robot arm body, a quick change interface needs to be set up.

The quick change interface for the joint of a robotic arm is used to connect the joints of the robotic arm, and/or connect a robotic arm body and an end effector of the robotic arm. It generally includes a mechanical interface and an electrical interface. It needs to meet a strength and stiffness connection requirement required by the robotic arm, and at the same time ensure smooth power and data connections between the joints and end effectors. The quick change interface is a necessary condition to ensure a maintainability of the robotic arm, which ensures a long-term stable operation of the robotic arm at a lower cost.

SUMMARY

One of the embodiments of the present application provides a joint quick change interface of a robotic arm, including a body side connector, a replacement side connector, and a driving locking device, and the driving locking device can be movably arranged on the replacing side connector, for driving the body side connector to lock or loosen the replacement side connector; Wherein, the driving locking device includes a driving assembly and a locking assembly; The driving assembly includes a cam mechanism, and the cam mechanism is rotationally connected to the body side connector; The locking assembly is movably connected to the body side connector, and the locking assembly includes a locked state and a released state; The cam mechanism abuts against the locking assembly, and the rotation of the cam mechanism can drive the locking assembly to move, so that the locking assembly switches between the locked state and the released state.

In some embodiments, the cam mechanism includes a cam, and when the locking assembly is in a locked state, the normal line of the contact surface between the locking assembly and the cam passes through the rotation center of the cam.

In some embodiments, the locking assembly includes a taper pin moving assembly, the taper pin moving assembly is slidably connected to the body side connector, the cam mechanism abuts the taper pin moving assembly, and the replacement The side connector has a first taper surface, and the taper pin moving assembly has a second taper surface for matching with the first taper surface; The rotary movement of the cam mechanism can be converted into the linear movement of the taper pin moving assembly, so that the second taper surface is engaged with or separated from the first taper surface. When one taper surface fits, the locking assembly is in a locked state, the body side connector is locked with the replacement side connector, and when the second taper surface is separated from the first taper surface, the locking assembly is in a loosened state, and the body side connector is loosened from the connector on the replacement side.

In some embodiments, the driving assembly further includes a link mechanism, the link mechanism is rotationally connected to the cam mechanism, and the link mechanism is eccentrically connected to the cam mechanism.

In some embodiments, the link mechanism includes a handle, a connection rod and a mounting plate, the mounting plate is detachably connected to the body side connector, the handle is rotationally connected to the mounting plate, and the connection rod One end of the connection rod is rotationally connected to the handle, and the other end of the connection rod is rotationally connected to the cam mechanism.

In some embodiments, the taper pin moving assembly includes a taper pin body and a rolling bearing, the rolling bearing is mounted on the taper pin body, the cam mechanism abuts against the taper pin body through the rolling bearing, the second taper surface is provided on the body of the taper pin.

In some embodiments, the taper pin moving assembly further includes a return spring, one end of the return spring is fixedly connected to the taper pin body, and the other end of the return spring is fixedly connected to the body side connector.

In some embodiments, the cam of the cam mechanism has several surface protrusion structures, and the several surface protrusion structures are evenly distributed along the circumference of the cam, and the number of the taper pin moving components is the same as that of the surface protrusions. The number of structures is the same, and a plurality of the taper pin moving assemblies are uniformly arranged around the axis of the body side connector on the end surface of the body side connector.

In some embodiments, the body side connector includes a connector body and a positioning rod, the positioning rod is fixedly connected to the connector body, the cam mechanism is sleeved on the positioning rod, and can rotate around the positioning rod. When the rod rotates, the connector body is provided with a connection rod mechanism placement cavity, a spring placement cavity and a first bolt hole, and a first positioning boss is formed on the connector body, and the first positioning boss and the second positioning boss A bolt hole is used for coordinating connection with the robotic arm body.

In some embodiments, the body side connector further includes an assembly ring, which is detachably connected to the connector body and restricts the taper pin moving assembly between the assembly ring and the connector body. Between the bodies, a reserved cavity adapted to the shape of the taper pin moving assembly is opened on the assembly ring, and the reserved cavity is used to provide a moving space for the taper pin moving assembly. The ring is also provided with a second positioning boss for cooperating with the replacement side connector.

In some embodiments, a positioning hole and a second bolt hole are also provided on the replacement side connector, and a third positioning boss is formed on the replacement side connector, and the third positioning boss and the second bolt hole are formed on the replacement side connector. The holes are all used for mating connection with the replacement end, and the positioning holes correspond to the second positioning boss, and are used to realize the positioning of the replacement side connector and the component ring.

In some embodiments, the locking assembly includes a push rod and at least one locking component, and the push rod is movably disposed in the body side connector, and has a locked position and an unlocked position; when the push rod moves from the unlocked position to the locked position, it can drive the locking component to move.

In some embodiments, a first slope is formed on the side of the push rod, a second slope is formed on the inner wall of the replacement side connector facing the first slope, and the locking component is disposed between the first slope and the first slope. Between the second slopes, when the push lever moves from the unlocked position to the locked position, the first slope pushes the locking component to move toward the second slope until the locking the component closely abuts against the first slope, the second slope and the body side connector.

In some embodiments, both the first slope and the second slope are annular taper surfaces, and the body side connector includes a body structure and a connecting structure, the connecting structure is annular, and is arranged around the push rod The main body structure is close to the end surface of the replacement side connector, and the connecting structure has a plurality of holes evenly distributed around its axis, and the locking pieces are arranged in one-to-one correspondence with the holes. Driven by the first slope, it can move through the hole.

In some embodiments, the main body structure is provided with a plurality of plunger holes facing the replacement part, and the plunger holes correspond to the holes one by one, and the body side connector further includes a plurality of plungers, so the plunger is elastic, one end is inserted into the plunger hole, and the other end extends out of the plunger hole and corresponds to the holes one by one, so as to prevent the locking component from falling out of the hole.

In some embodiments, a positioning post is formed on the end surface of the replacement side connector facing the body side connector, and a positioning hole is correspondingly formed on the end surface of the main body structure facing the replacement side connector. The positioning post is mated and plugged into the positioning hole.

In some embodiments, the driving locking device further includes a return spring, one end of the return spring abuts against the replacement side connector, and the other end abuts against the push rod, when the push rod is released from the unlocked position When moving to the locked position, the return spring is compressed.

In some embodiments, a positioning boss is formed on the end surface of the body side connector away from the replacement side connector, and an axle hole is opened on the positioning boss, and the cam mechanism includes a cam and a cam rotation axle, the cam rotation axle is fixedly connected to the cam and inserted into the axle hole to be rotationally connected to the axle hole.

In some embodiments, the cam mechanism further includes a rotation handle, the cam rotation axle passes through the axle hole and is fixedly connected to the rotation handle, and the rotation handle can drive the cam to rotate through the cam rotation axle, to drive the push rod to move.

One of the embodiments of the present application provides a robotic arm, which includes a robotic arm body and a replacement end, and also includes the joint quick change interface of the robotic arm according to any embodiment of the present application, wherein the body side connector is connected to the main body of the robotic arm is detachably connected, and the replacement side connector is detachably connected to the replacement end.

One of the embodiments of the present application provides a joint quick change interface of a robotic arm, including a body side connector, a replacement side connector, and a driving locking device, wherein the driving locking device includes a manually drive assembly and a taper pin movement Assemblies, the manually drive assembly is rotationally connected to the body side connector, the taper pin moving assembly is slidingly connected to the body side connector, the manually drive assembly abuts against the taper pin moving assembly, The replacement side connector has a first taper surface, and the taper pin moving assembly has a second taper surface for matching with the first taper surface; The rotary movement of the manually drive assembly can be converted into the linear movement of the taper pin moving component, so that the second taper surface is engaged with or separated from the first taper surface. When the first taper surface is matched, the body side connector is locked with the replacement side connector; when the second taper surface is separated from the first taper surface, the body side connector is locked with the Replacement side connector comes loose.

In some embodiments, the manually drive assembly includes a link mechanism and a cam mechanism, the cam mechanism is rotationally connected to the body side connector and abuts against the taper pin moving component, and the link mechanism It is rotationally connected to the cam mechanism, and the link mechanism is eccentrically connected to the cam mechanism.

In some embodiments, the link mechanism includes a handle, a connection rod and a mounting plate, the mounting plate is detachably connected to the body side connector, the handle is rotationally connected to the mounting plate, and the connection rod One end of the connection rod is rotationally connected to the handle, and the other end of the connection rod is rotationally connected to the cam mechanism.

In some embodiments, the taper pin moving assembly includes a taper pin body and a rolling bearing, the rolling bearing is mounted on the taper pin body, the cam mechanism abuts against the taper pin body through the rolling bearing, the second taper surface is provided on the body of the taper pin.

In some embodiments, the taper pin moving assembly further includes a return spring, one end of the return spring is fixedly connected to the taper pin body, and the other end of the return spring is fixedly connected to the body side connector.

In some embodiments, the cam of the cam mechanism has several surface protrusion structures, and the several surface protrusion structures are evenly distributed along the circumference of the cam, and the number of the taper pin moving components is the same as that of the surface protrusions. The number of structures is the same, and a plurality of the taper pin moving assemblies are uniformly arranged around the axis of the body side connector on the end face of the body side connector.

In some embodiments, the body side connector includes a connector body and a positioning rod, the positioning rod is fixedly connected to the connector body, the cam mechanism is sleeved on the positioning rod, and can rotate around the positioning rod. When the rod rotates, the connector body is provided with a connection rod mechanism placement cavity, a spring placement cavity and a first bolt hole, and a first positioning boss is formed on the connector body, and the first positioning boss and the second positioning boss A bolt hole is used for coordinating connection with the robotic arm body.

In some embodiments, the body side connector further includes an assembly ring, which is detachably connected to the connector body and restricts the taper pin moving assembly between the assembly ring and the connector body. Between the bodies, a reserved cavity adapted to the shape of the taper pin moving assembly is opened on the assembly ring, and the reserved cavity is used to provide a moving space for the taper pin moving assembly. The ring is also provided with a second positioning boss for cooperating with the replacement side connector.

In some embodiments, a positioning hole and a second bolt hole are also provided on the replacement side connector, and a third positioning boss is formed on the replacement side connector, and the third positioning boss and the second bolt hole are formed on the replacement side connector. The holes are all used for mating connection with the replacement end, and the positioning holes correspond to the second positioning boss, and are used to realize the positioning of the replacement side connector and the component ring.

One of the embodiments of the present application provides a robotic arm, which includes a robotic arm body and a replacement end, and also includes the joint quick change interface of the robotic arm according to any embodiment of the present application, wherein the body side connector is connected to the main body of the robotic arm is detachably connected, and the replacement side connector is detachably connected to the replacement end.

One of the embodiments of the present application provides a quick change interface for a robotic arm joint, which includes: a main body connected to the end of the robotic arm; a replacement part, the replacement part is detachably connected to the body part; and a drive lock part, the drive lock part includes a push rod and a cam mechanism, the push rod is movably arranged in the body part, has a locked position and an unlocked position, and is used to realize the replacement between the body part and the part, the cam mechanism is mounted on the body part, and is used to drive the push rod to move.

In some embodiments, the cam mechanism includes a cam, and the push rod abuts against the cam.

In some embodiments, when the push rod is in the locked position, the normal line of the contact surface between the push rod and the cam passes through the rotation center of the cam.

In some embodiments, the driving locking part further includes at least one locking component, which can drive the locking component to move when the push lever moves from the unlocked position to the locked position, so that the body part is connected to the replacement part.

In some embodiments, a first slope is formed on the side of the push rod, a second slope is formed on the inner wall of the replacement part facing the first slope, and the locking component is disposed between the first slope and the first slope. Between the second slopes, when the push lever moves from the unlocked position to the locked position, the first slope pushes the locking component to move toward the second slope until the locking component is in contact with the locking component. The first slope, the second slope and the body part are in close contact.

In some embodiments, both the first slope and the second slope are annular conical surfaces, the body part includes a body structure and a connecting structure, and the connecting structure is in the shape of a ring, arranged around the push rod The body structure is close to the end surface of the replacement part, and the connecting structure is evenly distributed with a plurality of round holes around its axis, and the locking parts are arranged in one-to-one correspondence with the round holes. Driven by the first slope, it can move through the circular hole.

In some embodiments, the main body structure is provided with a plurality of plunger holes facing the replacement part, and the plunger holes correspond to the round holes one by one, and the body part further includes a plurality of plungers. The plunger is elastic, one end is inserted into the plunger hole, and the other end extends out of the plunger hole and corresponds to the round holes one by one.

In some embodiments, a positioning post is formed on the end face of the replacement part facing the body part, and a positioning hole is correspondingly formed on the end face of the main body structure facing the replacement part, and the positioning post is connected to the positioning post. Holes fit for plugging.

In some embodiments, the driving locking part further includes a return spring, one end of the return spring abuts against the replacement part, and the other end abuts against the push rod, when the push rod moves from the unlocked position to the locked position, the return spring is compressed.

In some embodiments, a positioning boss is formed on the end surface of the body part away from the replacement part, and an axle hole is opened on the positioning boss, and the cam mechanism also includes a cam rotation axle, and the cam rotates The axle is fixedly connected to the cam and inserted into the axle hole to be rotationally connected to the axle hole.

In some embodiments, the cam mechanism further includes a rotation handle, the cam rotation axle passes through the axle hole and is fixedly connected to the rotation handle, and the rotation handle can drive the cam to rotate through the cam rotation axle, to drive the push rod to move.

One of the embodiments of the present application provides a robotic arm, including a robotic arm body and a replacement end, and also includes the joint quick change interface of the robotic arm according to any embodiment of the present application, wherein the body part and the robotic arm The end of the arm body is detachably connected, and the replacement part is detachably connected to the replacement end.

In some embodiments, the robotic arm is applied to a puncture surgical robot, and the replacement tip is a puncture tip.

One of the embodiments of the present application provides a robotic arm, which includes a robotic arm body and a replacement end, and also includes the joint quick change interface of the robotic arm according to any embodiment of the present application, wherein the body side connector is connected to the body of the robotic arm is detachably connected, and the replacement side connector is detachably connected to the replacement end; The robotic arm is applied to a puncture surgical robot, and the replacement end is a puncture end.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which the same reference numbers represent the same structures, and wherein.

DETAILED DESCRIPTION

Figure 1A:
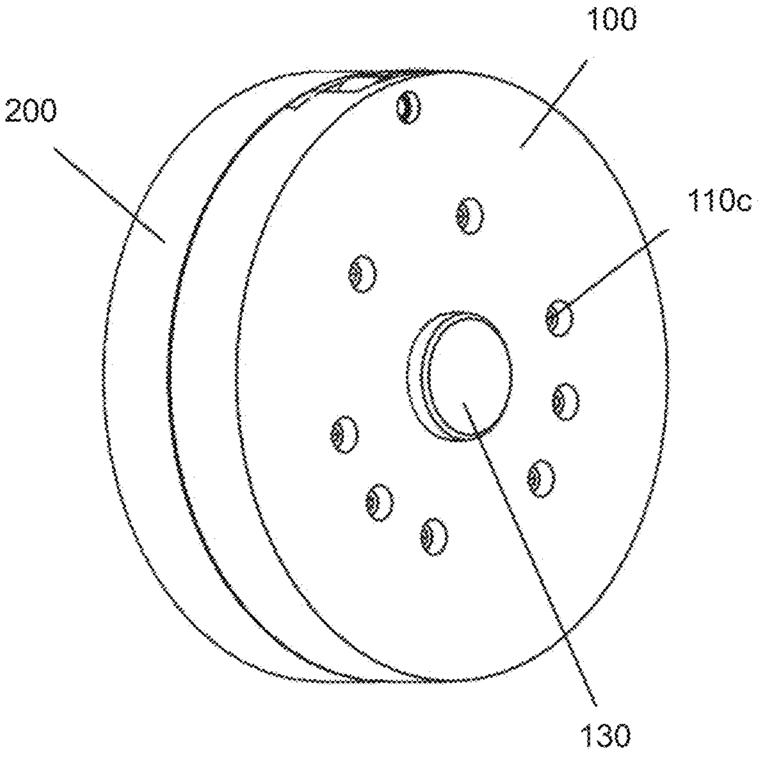
FIG. 1A is a schematic diagram illustrating a front structure of a quick change interface for a joint of a robotic arm according to some embodiments of the present disclosure.

In the following detailed description, numerous specific details are set forth by way of examples in order to provide a thorough understanding of the relevant disclosure. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless obviously obtained from the context or the context illustrates otherwise, the same numeral in the drawings refers to the same structure or operation.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

It should be noted that, when a component is referred to as being "mounted on", "fixed on" or "disposed on" another component, it may be directly on the other element or there may be an intervening component at the same time. When an element is referred to as being "connected to" another element, it can be directly connected to the other element or intervening elements may also be present. It should also be noted that the orientation terms such as left, right, up, and down in the embodiments of the present disclosure are only relative concepts or refer to the normal use state of the product, and should not be regarded as limiting.

Figure 1B:
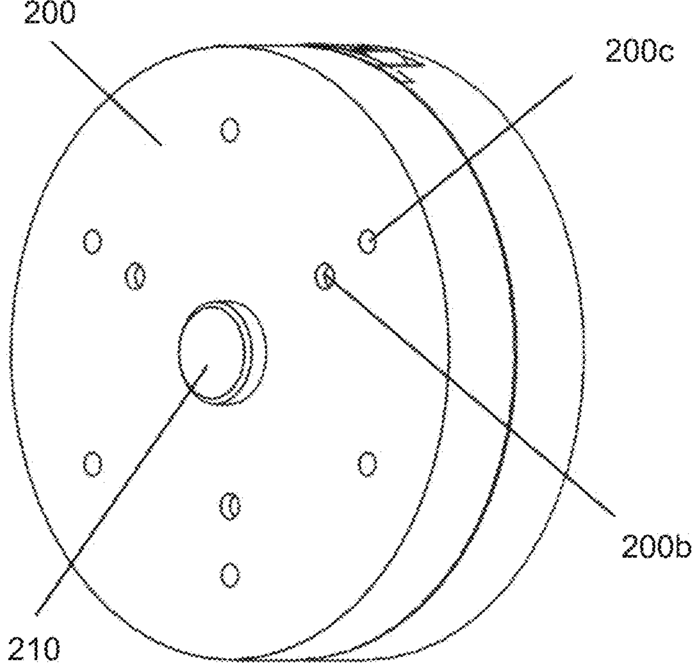
FIG. 1B is a schematic diagram illustrating a rear structure of a quick change interface for a joint of a robotic arm according to some embodiments of the present disclosure.
Figure 2:
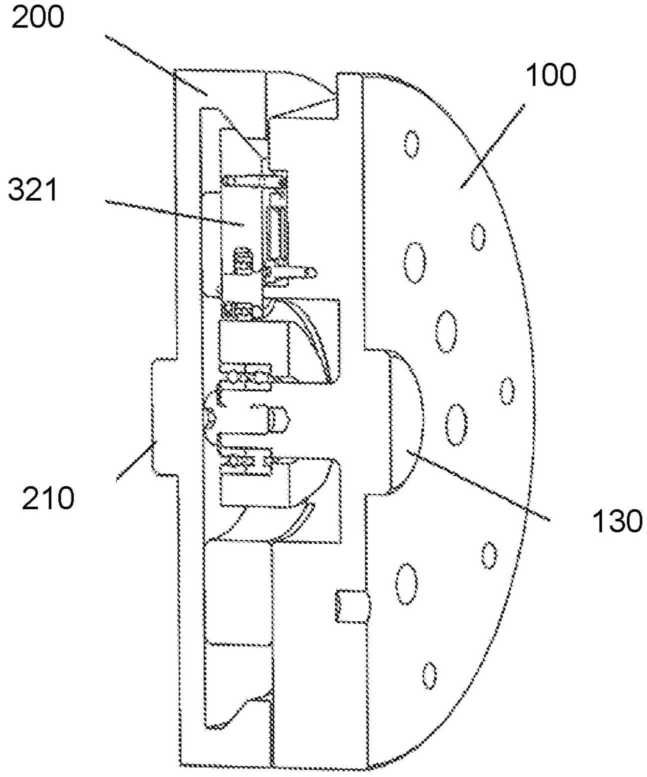
FIG. 2 is a schematic diagram illustrating a cross-sectional structure of a quick change interface for a joint of a robotic arm according to some embodiments of the present disclosure.
Figure 3A:
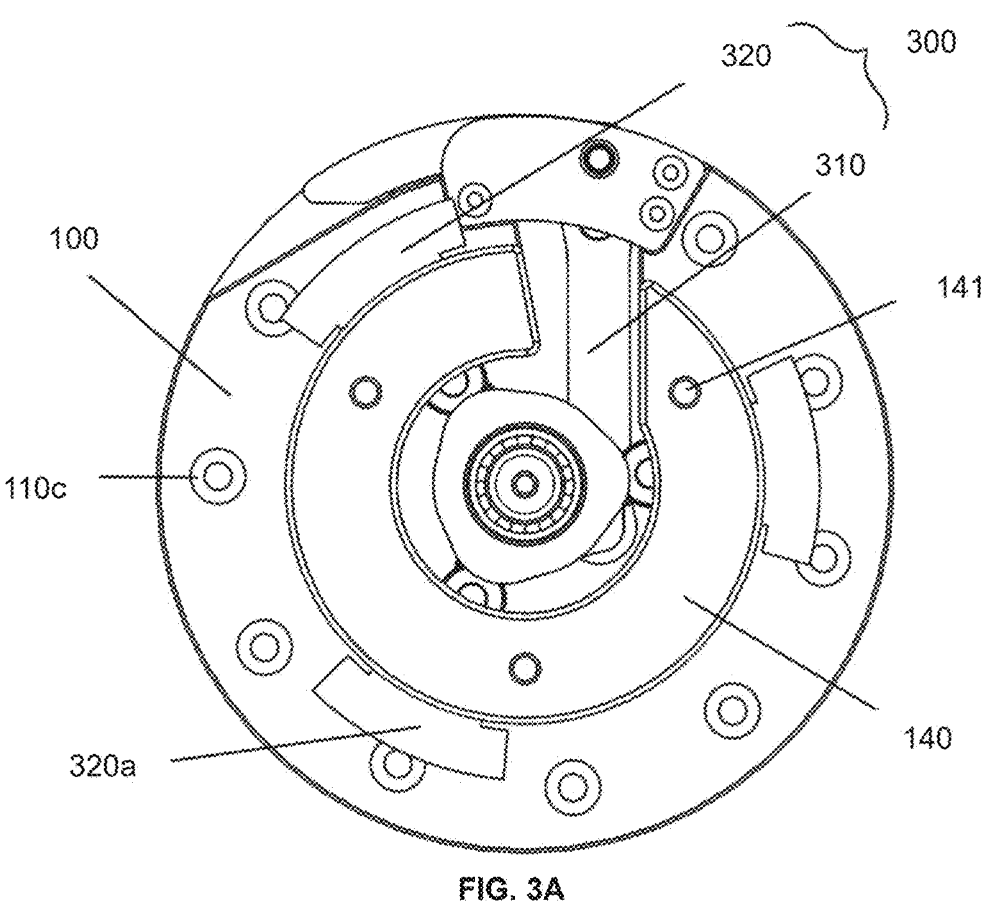
FIG. 3A is a schematic diagram illustrating a structure of a body side of a quick change interface of a robotic arm according to some embodiments of the present disclosure.
Figure 3B:
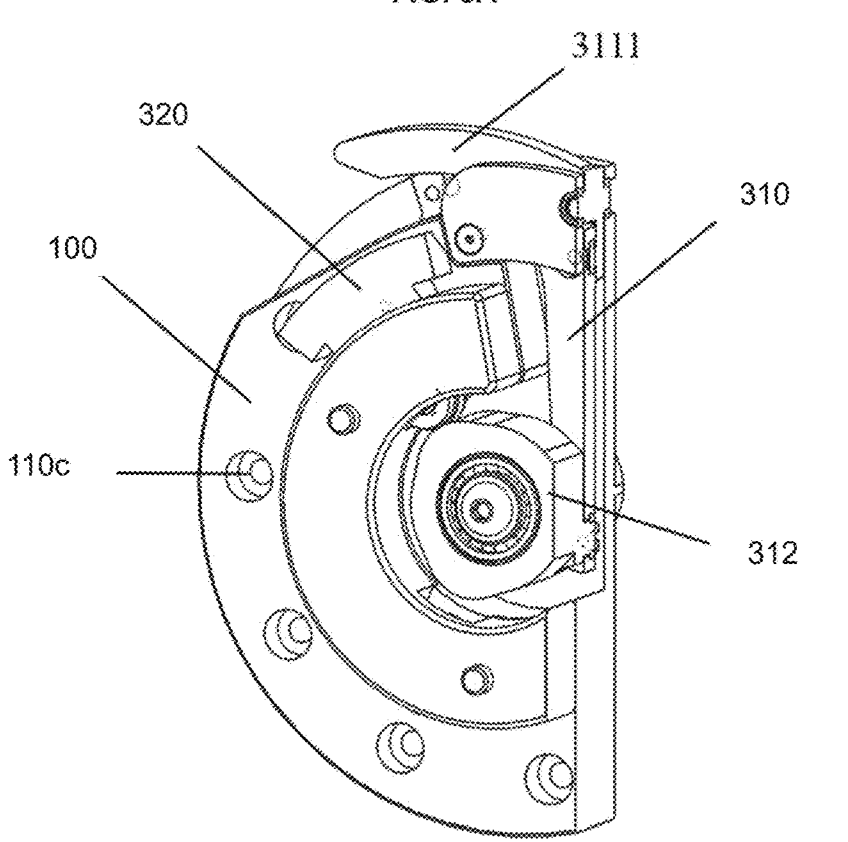
FIG. 3B is a schematic diagram illustrating a cross-sectional structure of a body side of a quick change interface of a robotic arm according to some embodiments of the present disclosure.
Figure 4:
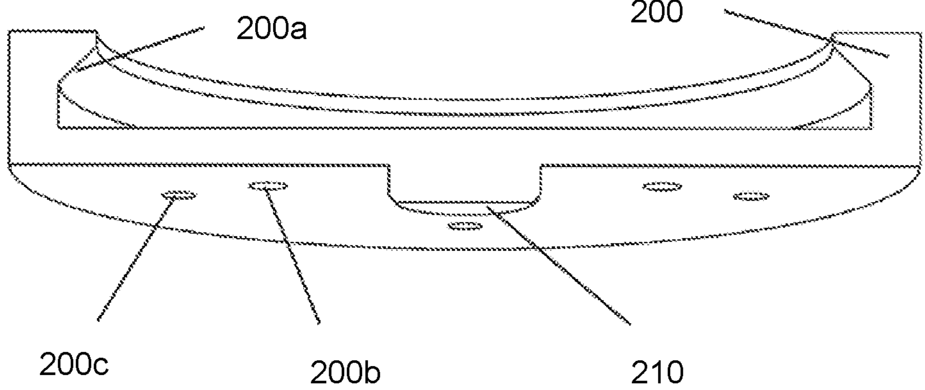
FIG. 4 is a schematic diagram illustrating a structure of a replacement side of a quick change interface for a joint of a robotic arm according to some embodiments of the present disclosure.

FIG. 1A is a schematic diagram illustrating a front structure of a quick change interface for a joint of a robotic arm according to some embodiments of the present disclosure; FIG. 1B is a schematic diagram illustrating a rear structure of a quick change interface for a joint of a robotic arm according to some embodiments of the present disclosure; FIG. 2 is a schematic diagram illustrating a cross-sectional structure of a quick change interface for a joint of a robotic arm according to some embodiments of the present disclosure; FIG. 3A is a schematic diagram illustrating a structure of a body side of a quick change interface of a robotic arm according to some embodiments of the present disclosure; FIG. 3B is a schematic diagram illustrating a cross-sectional structure of a body side of a quick change interface of a robotic arm according to some embodiments of the present disclosure; FIG. 4 is a schematic diagram illustrating a structure of a replacement side of a quick change interface for a joint of a robotic arm according to some embodiments of the present disclosure. Please refer to FIG. 1 to FIG. 4, the embodiment of the present disclosure provides the quick change interface for a joint of the robotic arm. The quick change interface for a joint of the robotic arm includes a body side connector 100, a replacement side connector 200 and a driving locking device 300. The body side connector 100 is used to connect with a robot arm body, the replacement side connector 200 is used to connect with a replacement end, and the driving locking device 300 is used to implement the locking of the body side connector 100 with the replacement side connector 200 and releasing of the body side connector 100 from the replacement side connector 200.

In some embodiments, the driving locking device 300 may include a driving assembly and a locking assembly. The locking assembly may be movably connected to the body side connector 100. The locking assembly may include a locked state and a released state. The driving assembly may be used to drive the locking assembly to move so that the locking assembly switches between the locked state and the released state. When the locking assembly is in the locked state, the body side connector 100 and the replacement side connector 200 are locked; and when the locking assembly is in the released state, the body side connector 100 and the replacement side connector 200 are released (separated).

In some embodiments, the driving assembly may include a manually drive assembly 310. The locking assembly may include a taper pin moving assembly 320, the manually drive assembly 310 is rotationally connected to the body side connector 100, the taper pin moving assembly 320 is slidably connected to the body side connector 100, and the manually drive assembly 310 abuts against the taper pin moving assembly 320. The replacement side connector 200 has a first taper surface 200*a*, and the taper pin moving assembly has a second taper surface 320*a* mating with the first taper surface 200*a*.

The rotational movement of the manually drive assembly 310 may be converted into a linear movement of the taper pin moving assembly, so that the second taper surface 320*a* is mated with or separated from the first taper surface 200*a*. When the second taper surface 320*a* is mated with the first taper surface 200*a*, the body side connector 100 is locked with the replacement side connector 200, and when the second taper surface 320*a* is separated from the first taper surface 200*a*, the body side connector 100 is released from the replacement side connector 200.

In this embodiment, the locking of the body side connector 100 with the replacement side connector 200 or releasing of the body side connector 100 from the replacement side connector 200 may be implemented by the mating state of the first taper surface 200*a* and the second taper surface 320*a*. During the specific implementation, when the first taper surface 200*a* is mated with the second taper surface 320*a*, the taper pin moving assembly 320 abuts against the replacement side connector 200 and cannot rotate relative to the replacement side connector 200 so that the body side connector 100 and the replacement side connector 200 are locked. When the first taper surface 200*a* is separated from the second taper surface 320*a*, the taper pin moving assembly 320 and the replacement side connector 200 are separated, so that the body side connector 100 and the replacement side connector 200 are released.

In some embodiments, the mating state of the first taper surface 200*a* and the second taper surface 320*a* are determined by a position of the taper pin moving assembly 320, and the taper pin moving assembly 320 is driven by the manually drive assembly 310 to move in a straight line. When the manually drive assembly 310 is driven by an external force, the manually drive assembly 310 may rotate relative to the body side connector 100, and then drive the taper pin moving assembly 320 to perform the linear movement, so that a position of the taper pin moving assembly 320 may change, and then the second taper surface 320*a* may be mated with or separated from the first taper surface 200*a*. During the specific implementation, when the manually drive assembly 310 rotates clockwise (as viewed from the perspective of FIG. 3A), it drives the second taper surface 320*a* of the taper pin moving assembly 320 to move away from the first taper surface 200*a*. When the manually drive assembly 310 rotated clockwise to an extreme position, the first taper surface 200*a* is completely separated from the second taper surface 320*a*. At this time, the body side connector 100 and the replacement side connector 200 are released, and the replacement side connector 200 may be taken off. When the manually drive assembly 310 rotates counterclockwise (as viewed from the perspective of FIG. 3A), it drives the second taper surface 320*a* of the taper pin moving assembly 320 to move close to the first taper surface 200*a*. When the manually drive assembly 310 is rotated counterclockwise to an extreme position, the first taper surface 200*a* mates with the second taper surface 320*a*, and at this time the body side connector 100 is locked with the replacement side connector 200.

The manually drive assembly 310 described in the embodiment of the present disclosure may be driven manually without driving devices or additional devices such as cylinders and motors, so that volume and weight of the entire quick change interface are greatly reduced, so as to avoid a deformation of the robotic arm caused by an excessive weight of the replacement end. The quick change interface with the manually drive assembly is suitable for occasions that require a high rigidity of the entire robotic arm in a high movement precision.

In addition, the embodiment of the present disclosure relies on the cooperation between the taper surfaces, which connects the body side connector 100 and the replacement side connector 200. Due to the use of a spaced annular surface contact, the rigidity and bearing capacity of the connection can be greatly improved, and an application range of the robotic arm is further improved.

It should be noted that, in order to ensure that when the first taper surface 200*a* and the second taper surface 320*a* are mated or separated, the body side connector 100 and the replacement side connector 200 may be locked or released, the first taper surface 200*a* is an inner surface of the replacement side connector 200, and the second taper surface 320*a* is an outer surface of the taper pin moving assembly 320. In other embodiments, the first taper surface 200 may be an outer surface, and the second taper surface 320*a* may further be an inner surface, which is not limited in the present disclosure.

In some embodiments, the manually drive assembly 310 may include a link mechanism 311 and a cam mechanism 312. The cam mechanism 312 may be rotationally connected to the body side connector 100 and abuts against the taper pin moving assembly 320. The link mechanism 311 is rotationally and eccentrically connected to the cam mechanism 312. The link mechanism 311 is used to be driven by an external force. As the link mechanism 311 is connected eccentrically to the cam mechanism 312, when the link mechanism 311 is driven by the external force, the link mechanism 311 may drive the cam mechanism 312 to rotate. When the cam mechanism 312 rotates, the taper pin moving assembly 320 moves linearly, so that the first taper surface 200*a* is mated with or separated from the second taper surface 320*a*.

It should be noted that in the present disclosure, the link mechanism and the cam mechanism are used to realize a transition from the rotation to a linear displacement. Due to a self-locking performance of the link mechanism and the cam mechanism, a double self-locking layout is adopted. When the quick change interface is working, that is, when a body side of the robot arm is connected to a replacement side, the double self-locking function may reliably connect the body side and the replacement side to achieve a better connection effect. Specifically, when the body side of the robot arm is connected to the replacement side, an axis where a connection rod 3112 is located passes through a rotation axle of a handle 3111 (such as the first bearing assembly 3114) to form the self-locking. At the same time, a normal of a contact surface between the taper pin moving assembly 320 and a cam of the cam mechanism 312 passes through a rotation center of the cam to form the self-locking. In some alternative embodiments, the link mechanism and the cam mechanism may be replaced by mechanisms such as a rack and an eccentric gear respectively, which can also implement and the conversion from the rotation to the linear movement.

Figure 5:
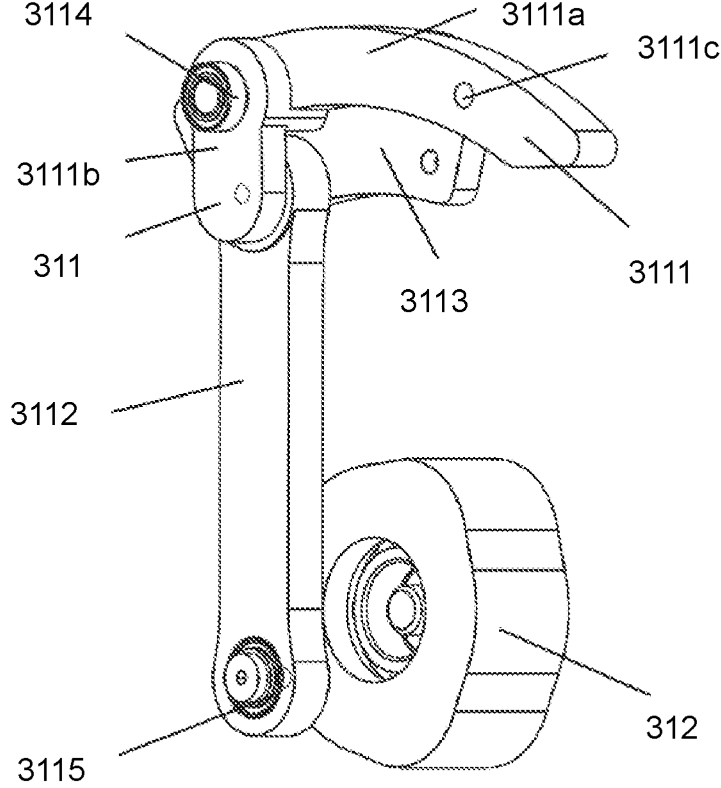
FIG. 5 is a schematic diagram illustrating a first structure of a manually drive assembly in a quick change interface of a robotic arm according to some embodiments of the present disclosure.
Figure 6:
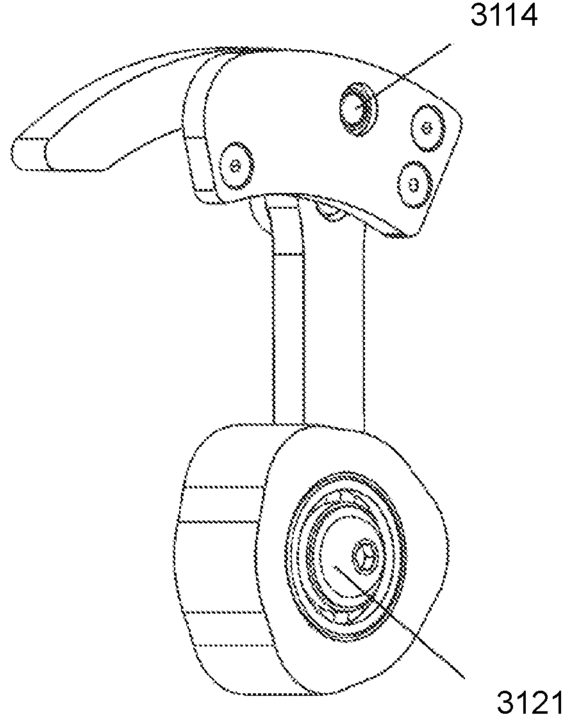
FIG. 6 is a schematic diagram illustrating a second structure of a manually drive assembly in a quick change interface of a robotic arm according to some embodiments of the present disclosure.
Figure 7:
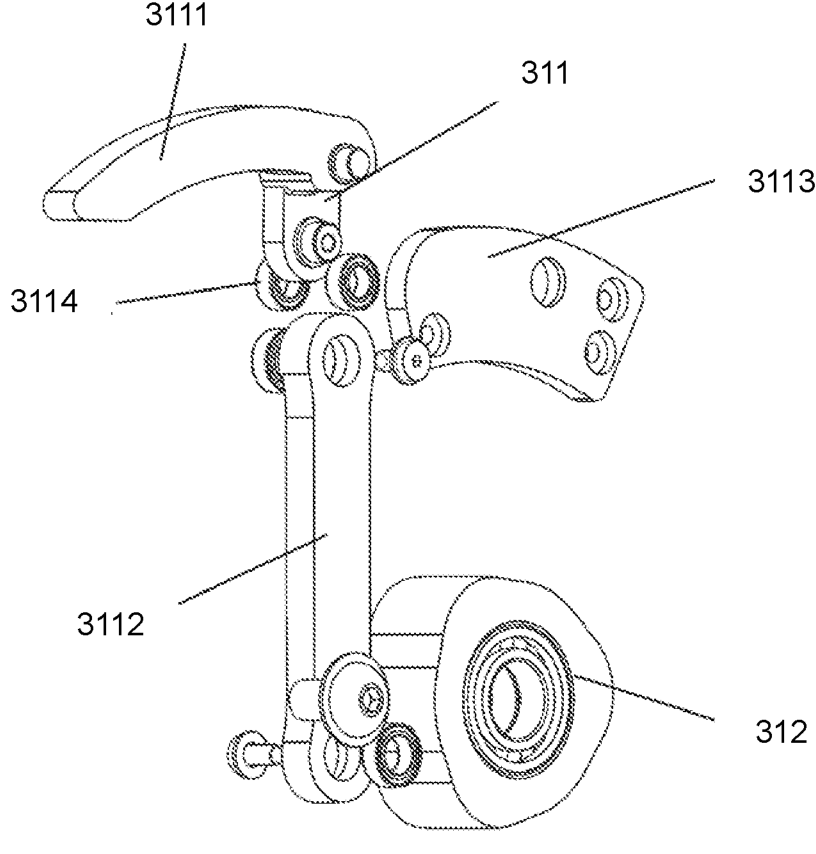
FIG. 7 is a schematic diagram illustrating an explosion structure of a manually drive assembly in a quick change interface of a robotic arm according to some embodiments of the present disclosure.

FIG. 5 is a schematic diagram illustrating a first structure of a manually drive assembly in a quick change interface of a robotic arm according to some embodiments of the present disclosure; FIG. 6 is a schematic diagram illustrating a second structure of a manually drive assembly in a quick change interface of a robotic arm according to some embodiments of the present disclosure; FIG. 7 is a schematic diagram illustrating an explosion structure of a manually drive assembly in a quick change interface of a robotic arm according to some embodiments of the present disclosure. Please refer to FIGS. 5 to 7, in some embodiments, the link mechanism 311 includes the handle 3111, the connection rod 3112 and a mounting plate 3113. The mounting plate 3113 is detachably connected to the body side connector 100, the handle 3111 is rotationally connected to the mounting plate 3113, one end of the connection rod 3112 is rotationally connected to the handle 3111, and the other end of the connection rod 3112 is rotationally connected to the cam mechanism 312.

In some embodiments, the handle 3111 is used for a manual driving by a user. In order to facilitate the use, in this embodiment, the handle 3111 may be an L-shaped handle, with a handle part 3111*a* and a connection rod part 3111*b*, a rotation of the handle part 3111*a* may drive the connection rod part 3111*b* to rotate, and the connection rod part 3111*b* is rotationally connected to the connection rod 3112. In some embodiments, a length of the connection rod part 3111*b* may be shorter than the length of the handle part 3111*a*, so as to reduce an arm of force of the connection rod part 3111*b* and increase a force applied by the connection rod part 3111*b* on the connection rod 3112, thereby enabling the user to more easily perform the manual driving. In some embodiments, the mounting plate 3113 is used to implement an installation of the handle 3111. In some embodiments, as shown in FIGS. 5-7, a connecting portion of the handle part 3111*a* of the handle 3111 and the connection rod part 3111*b* may be rotationally connected to the mounting plate 3113. In some embodiments, the handle 3111 may be of other shapes. For example, the handle 3111 may be straight, arc-shaped, U-shaped, etc. In some embodiments, the connection rod 3112 is used to transmit movement so that the cam mechanism 312 may rotate.

In some embodiments, as shown in FIGS. 5-7, in order to ensure a movement stability and coherence of the link mechanism 311, the link mechanism may further include a first bearing assembly 3114 and a second bearing assembly 3115. The first bearing assembly 3114 is used to realize the connection between the handle 3111 and the mounting plate 3113 to ensure that the handle 3111 rotates smoothly. The second bearing assembly 3115 is used to realize the connection between the connection rod 3112 and the cam mechanism 312 to ensure the rotation stability of the cam mechanism 312.

Figure 9:
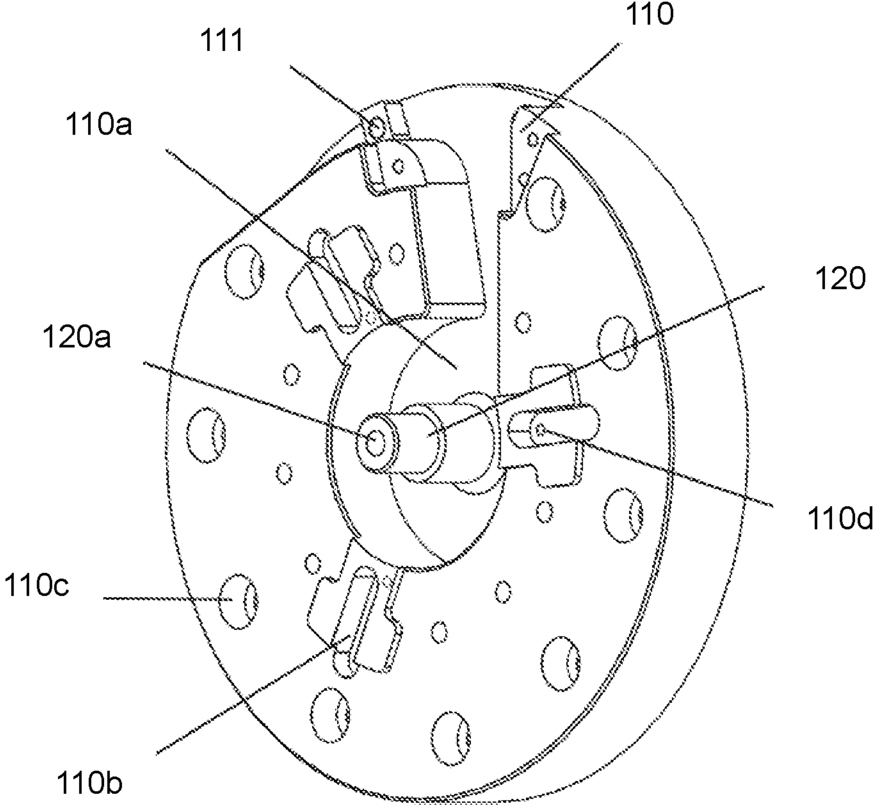
FIG. 9 is a schematic diagram illustrating a structure of a body side connector in a quick change interface for a joint of a robotic arm according to some embodiments of the present disclosure.

In some embodiments, the link mechanism 311 may further include a plunger (not shown in the figure), which is fixedly arranged on a plunger mounting hole 111 of the body side connector (as shown in FIG. 9). The handle 3111 may be provided with a counterbore 3111*c* (as shown in FIG. 5) mated with the plunger. The plunger is used to limit the rotation of the handle 3111, thereby increasing a reliability of the connection between the handle 3111 and the body side connector. In some embodiments, the plunger may be elastic, and one end of the plunger may be inserted into the plunger mounting hole 111 (such as being fixedly connected to the plunger mounting hole 111), and the other end of the plunger may be exposed outside the plunger mounting hole 111. When the handle 3111 drives the taper pin moving assembly 320 to be in the locked state (as shown in FIG. 3A), the other end of the plunger may be pressed into the counterbore 3111*c* on the handle 3111, so that the handle 3111 can better keep the locked state. In some embodiments, the plunger may be made of an elastomeric material (e.g., rubber, etc.). In some embodiments, the plunger may be a spring.

Figure 8:
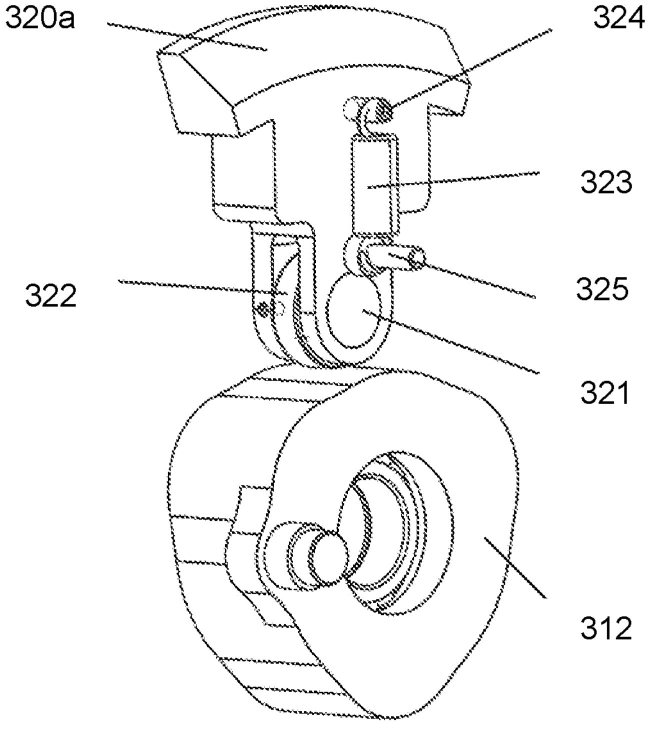
FIG. 8 is a schematic diagram illustrating a structure of a taper pin moving assembly in a quick change interface for a joint of a robotic arm according to some embodiments of the present disclosure.

FIG. 8 is a schematic diagram illustrating a structure of a taper pin moving assembly in a quick change interface for a joint of a robotic arm according to some embodiments of the present disclosure. In some embodiments, please refer to FIG. 8, the taper pin moving assembly 320 may include a taper pin body 321 and a rolling bearing 322. The rolling bearing 322 may be mounted on the taper pin body 321, and the cam mechanism 312 abuts against the taper pin body 321 through the rolling bearing 322, and the second taper surface

320*a* is opened on the taper pin body 321. The taper pin body 321 is used to mate with or separate from the replacement side connector 200, and the rolling bearing 322 may convert a sliding friction between the taper pin body 321 and the cam mechanism 312 into a rolling friction, thereby reducing a resistance of the handle 3111 during rotation, and providing convenience for the manual driving.

In some embodiments, please continue to refer to FIG. 8, the taper pin moving assembly 320 may further include a return spring 323. One end of the return spring 323 is fixedly connected to the taper pin body 321, and the other end of the return spring 323 is fixedly connected to the body side connector 100.

In some embodiments, when the cam mechanism 312 rotates and needs to drive the taper pin moving assembly 320 away from the replacement side connector 200, if there is no restoring force, it may be difficult for the taper pin moving assembly 320 to restore, or the taper pin moving assembly 320 may restore slow. In order to facilitate the restore of the taper pin moving assembly 320, the return spring 323 is provided in the embodiments of the present disclosure. When the taper pin body 321 mates with the replacement side connector 200 (e.g., when the taper pin moving assembly 320 is in the locked state), the return spring 323 is stretched (or compressed). When the taper pin body 321 needs to be separated from the replacement side connector 200, the cam mechanism 312 rotates, and the return spring 323 starts resetting. Due to a restoring force of the return spring 323, the taper pin body 321 may be quickly separated from the replacement side connector 200. During a specific implementation, one end of the return spring 323 may be fixedly connected to the taper pin body 321 through a first fixing screw 324, and the other end of the return spring 323 is fixedly connected to the body side connector 100 through a second fixing screw 325. For example, the other end of the return spring 323 may be connected to the second fixing screw 325, and the second fixing screw 325 may be connected (e.g., clamped) to a fixing hole 110*d* in a spring placement chamber 110*b* of the body side connector 100 (as shown in FIG. 9).

In some embodiments, please refer to FIG. 3A and FIG. 3B, the cam of the cam mechanism 312 may have several (e.g., 2, 3, 4, etc.) surface protruding structures. The several surface protruding structures are evenly distributed along a circumference of the cam. A number of the taper pin moving assemblies 320 is the same as the number of the surface protrusion structures, and a plurality of taper pin moving assemblies 320 are evenly uniformly set around an axis of the body side connector 100 on an end surface of the body side connector 100.

In some embodiments, the cam of the cam mechanism 312 has several highest points. When the highest points of the surface protrusion structures abut against the taper pin moving assembly 320, the first taper surface 200*a* is mated with the second taper surface 320*a*. In the present disclosure, a plurality of taper pin moving assemblies 320 are provided, which means that the embodiments of the present disclosure use a plurality of second taper surfaces 320*a* to mate with the first taper surface 200*a*, which further ensures a reliability of the connection.

FIG. 9 is a schematic diagram illustrating a structure of a body side connector in a quick change interface for a joint of a robotic arm according to some embodiments of the present disclosure. In some embodiments, please refer to FIG. 9, the body side connector 100 includes a connector body 110 and a positioning rod 120. The positioning rod 120 is fixedly connected to the connector body 110. The cam mechanism 312 may be sleeved on (e.g., through a bearing) the positioning rod 120, and rotate around the positioning rod 120. In some embodiments, a mounting hole 120*a* is formed on the positioning rod 120, the cam mechanism 312 may be mounted in the mounting hole 120*a*, and the mounting hole 120*a* is arranged along an axial direction of the positioning rod 120, so that the cam mechanism 312 may rotate around the positioning rod 120. In other embodiments, the cam mechanism 312 may further be directly sleeved on the positioning rod 120, which is not limited in the present disclosure. In some embodiments, after the cam mechanism 312 is sleeved on the positioning rod 120, a blocking component may be mounted in the mounting hole 120*a*, so that the cam mechanism 312 may not be detached from the positioning rod 120. In some embodiments, the mounting hole 120*a* may be a threaded hole. In some embodiments, the connector body 110 is provided with a link mechanism placement chamber 110*a*, a spring placement chamber 110*b* and a first bolt hole 110*c*. A first positioning boss 130 is further formed on the connector body 110. Both the first positioning boss 130 and the first bolt hole 110*c* are used to mate with the robot arm body.

In some embodiments, the mounting hole 120*a* is used to implement the connection between the body side connector 100 and the cam mechanism 312. In a specific embodiment, the cam mechanism 312 is mounted in the mounting hole 120*a* through a third bearing assembly 3121 to ensure a smooth rotation. The link mechanism placement cavity 110*a* is used to place the link mechanism 311, and the spring placement cavity 110*b* is used to place the return spring 323, so as to reduce a volume of the entire quick change interface. The first positioning boss 130 and the first bolt hole 110*c* are used to realize a positioning and connection of the body side connector 100 and the robot arm body, so as to ensure an accuracy of installation.

Figure 10A:
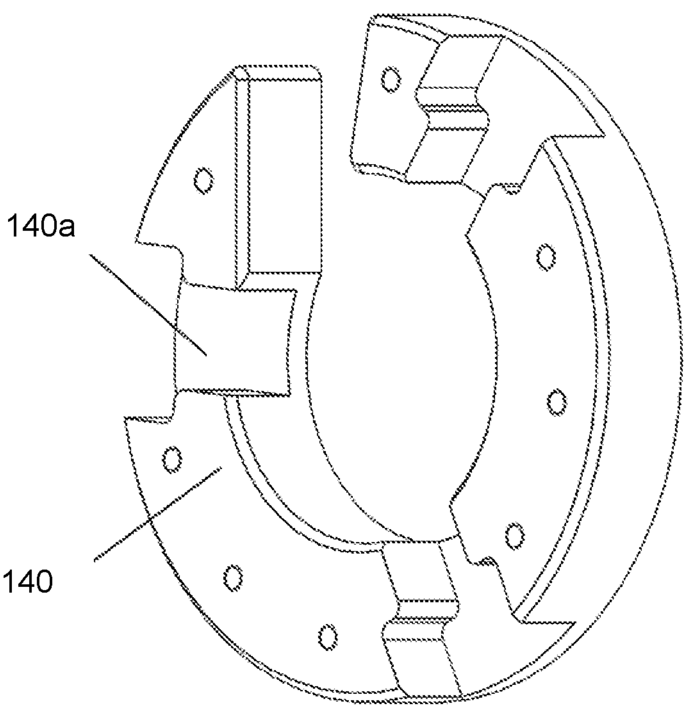
FIG. 10A is a schematic diagram illustrating a structure of an assembly ring in a quick change interface for a joint of a robotic arm according to some embodiments of the present disclosure.
Figure 10B:
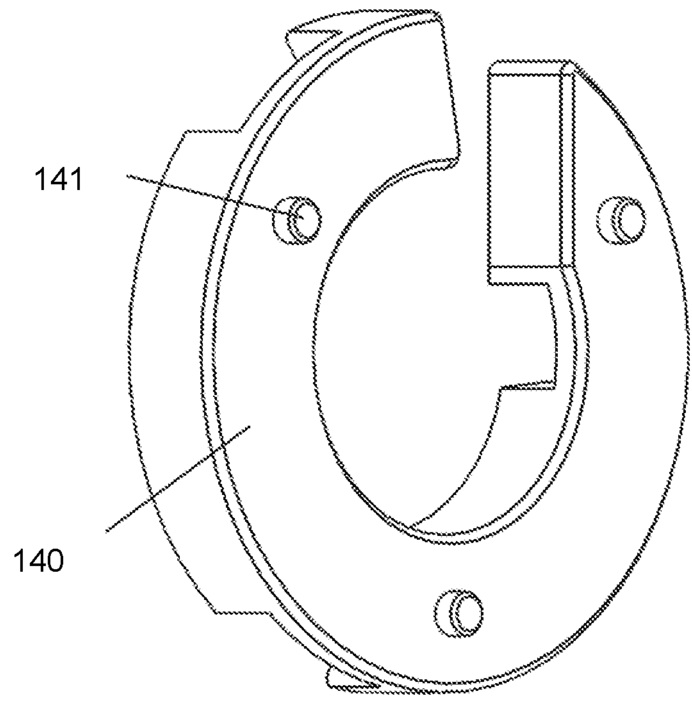
FIG. 10B is a schematic diagram illustrating a structure of an assembly ring in a quick change interface for a joint of a robotic arm according to some embodiments of the present disclosure.

FIG. 10A is a schematic diagram illustrating a structure of an assembly ring in a quick change interface for a joint of a robotic arm according to some embodiments of the present disclosure; FIG. 10B is a schematic diagram illustrating a structure of an assembly ring in a quick change interface for a joint of a robotic arm according to some embodiments of the present disclosure. In some embodiments, please refer to FIG. 10A and FIG. 10B, the body side connector 100 further includes an assembly ring 140. The assembly ring 140 is detachably connected to the connector body 110. The taper pin moving assembly 320 is limited between the assembly ring 140 and the connector body 110. The assembly ring 140 is provided with a reserved cavity 140*a* adapted to a shape of the taper pin moving assembly 320. The reserved cavity 140*a* is used to provide a moving space for the taper pin moving assembly 320. The assembly ring 140 is also provided with a second positioning boss 141 (as shown in FIG. 3A) for mating with the replacement side connector 200.

In some embodiments, the assembly ring 140 may achieve a radial positioning with the replacement side connector 200. The radial positioning is specifically implemented through the mating of the second positioning boss 141 with the replacement side connector 200. In addition, the assembly ring 140 may further limit the taper pin moving assembly 320 between the assembly ring 140 and the connector body 110, so as to ensure that the taper pin moving assembly 320 moves according to a predetermined route without falling off.

In some embodiments, please refer to FIG. 4, a positioning hole 200*b* and a second bolt hole 200*c* may further be provided on the replacement side connector 200, and a third positioning boss 210 is also formed on the replacement side connector 200, Both the third positioning boss 210 and the second bolt hole 200*c* are used to connect with a replacement end, and the positioning hole 200*b* corresponds to the second positioning boss 141, and is used to implement a positioning of the replacement side connector 200 and the assembly ring 140. The third positioning boss 210 and the second bolt hole 200*c* are used to implement the positioning and connection of the replacement side connector 200 and the replacement end, so as to ensure an accuracy of installation. The positioning hole 200*b* is used to mate with the second positioning boss 141, so as to implement the radial positioning of the assembly ring 140 and the replacement side connector 200.

Based on the above-mentioned quick change interface of the robotic arm, the embodiments of the present disclosure also provide a robotic arm, including a robotic arm body, a replacement end, and the quick change interface for the joint of the robotic arm as described in the above-mentioned embodiments. The body side connector is detachably connected to the robotic arm body, and the replacement side connector is detachably connected to the replacement end. The replacement end of the robotic arm may be replaced quickly through the quick change interface, and a deformation of the robotic arm may be reduced, which is suitable for occasions requiring a high rigidity of the entire robotic arm with a high movement precision. As the quick change interface for the joint of the robotic arm has been described in detail above, the details are not repeated here.

According to the robotic arm and its quick change interface provided in the present disclosure, the connection or separation of the body side and the replacement side (e.g., body side connector and replacement side connector) may be implemented by setting two taper surfaces that can be mated, and a mating state of the taper surfaces is determined by a position of the taper pin moving assembly. The movement of the taper pin moving assembly is driven by a manually drive assembly. The manually drive assembly may be directly manually driven, and no driving devices or additional devices such as cylinders and motors are required, so that volume and weight of the entire quick change interface are greatly reduced. As a result, the deformation of the robotic arm caused by an excessive weight of the replacement end may be avoided, which is suitable for occasions that require the high rigidity of the entire robotic arm with the high movement precision. Moreover, due to the contact of a spaced annular surface, the rigidity and bearing capacity of the connection can be greatly improved, and an application range of the robotic arm is further improved. In addition, the present disclosure utilizes a self-locking performance of the link mechanism and the cam mechanism, and adopts a double self-locking layout. When the quick change interface is working, the double self-locking takes effect, which reliably connects the body side connector and the replacement side connector. Moreover, a plugger is used to lock the handle to further increase the connection reliability.

In some embodiments, the driving assembly may include the cam mechanism and a driving mechanism. The driving mechanism may be used to drive the cam mechanism to rotate and form the self-lock with the cam mechanism when the locking assembly is in the locked state. In some embodiments, the driving mechanism may include the manually drive assembly. In some embodiments, the driving mechanism may include a motor driving mechanism (such as a servo motor, a geared motor, etc.), a hydraulic driving mechanism, a pneumatic driving mechanism, etc. In some embodiments, the motor driving mechanism may be directly connected to an axle of the cam to drive the cam to rotate or stop. In some embodiments, the motor driving mechanism may be connected to the cam through a connection rod (e.g., the connection rod 3112), so that the connection rod drives the cam to rotate or stop.

Figure 11:
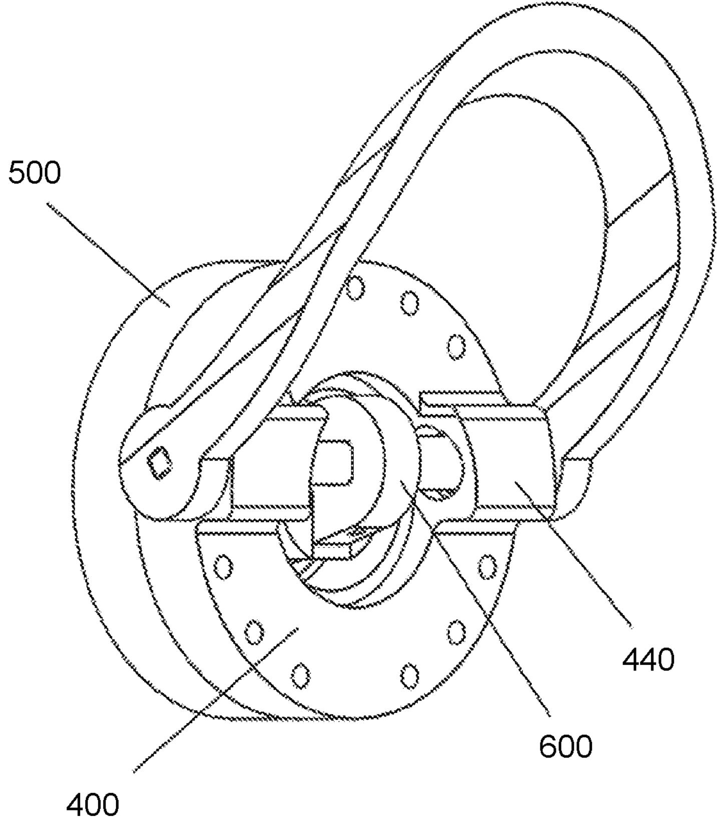
FIG. 11 is a schematic diagram illustrating a structure of a quick change device at an end of a robot according to some embodiments of the present disclosure.
Figure 12:
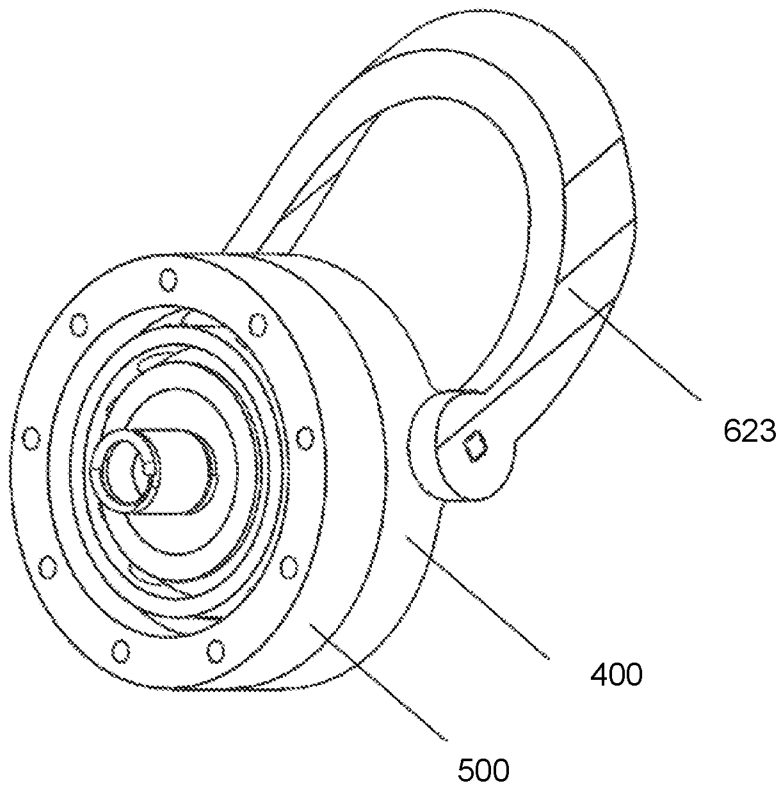
FIG. 12 is a schematic diagram illustrating a structure of a quick change device at an end of a robot according to some embodiments of the present disclosure.
Figure 13:
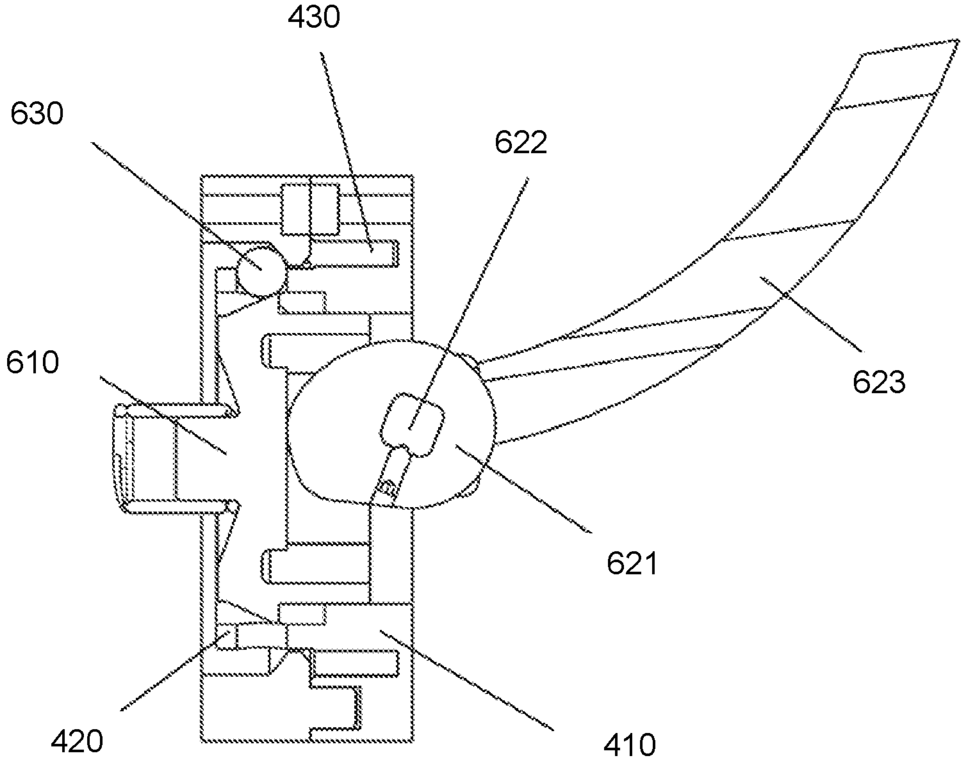
FIG. 13 is a cross-sectional view of a quick change device at an end of a robot in a locked state according to some embodiments of the present disclosure.
Figure 14:
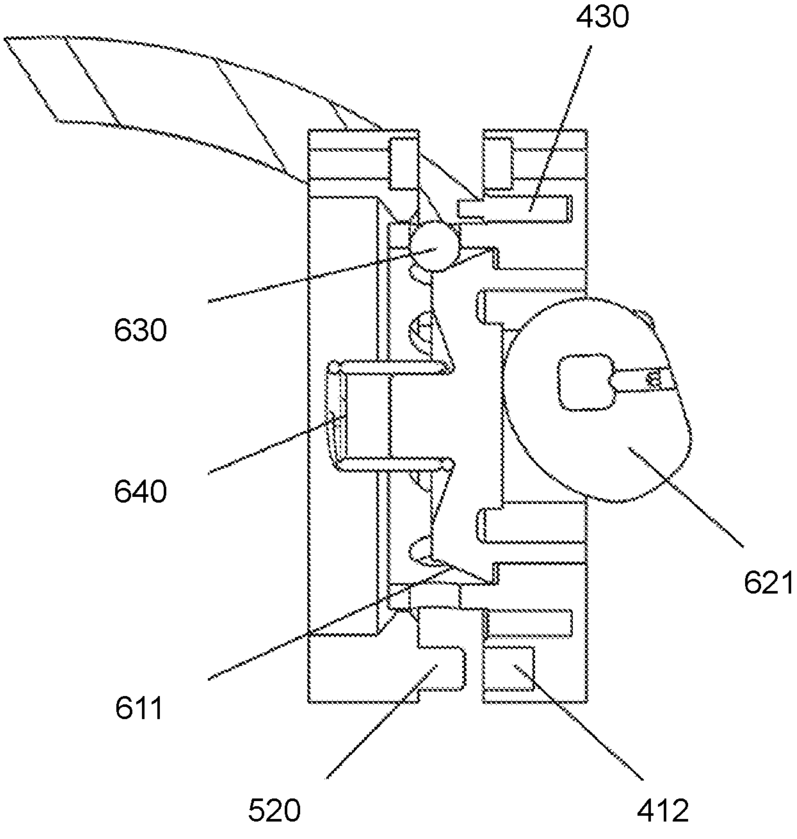
FIG. 14 is a cross-sectional view of a quick change device at an end of a robot in a released state according to some embodiments of the present disclosure.
Figure 15:
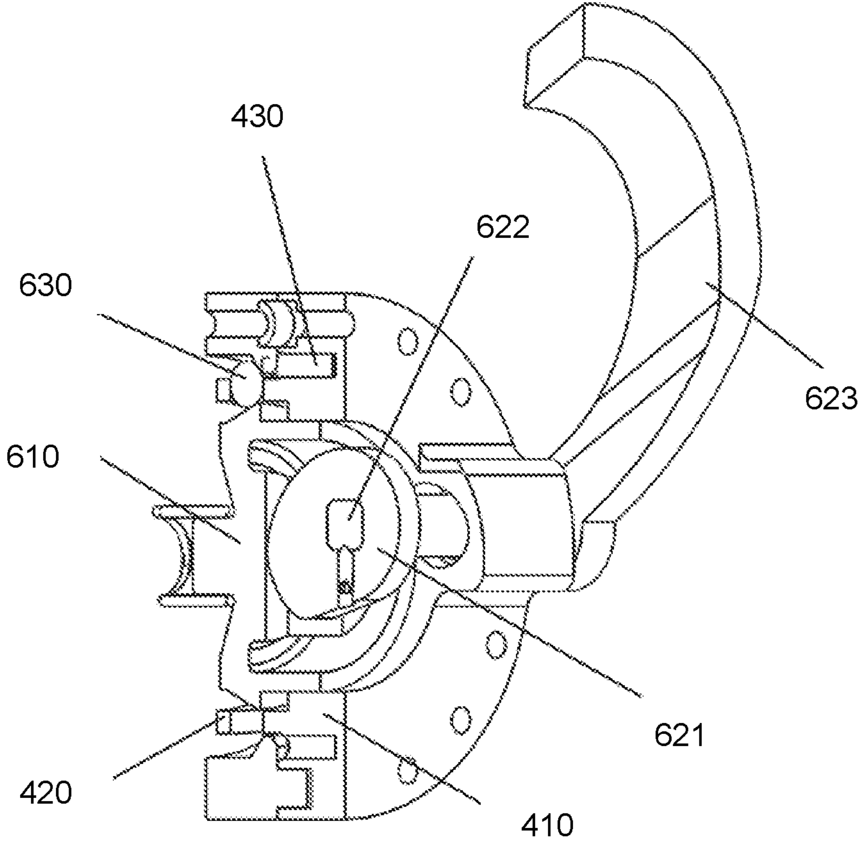
FIG. 15 is a cross-sectional view of a quick change device at an end of a robot in an intermediate state according to some embodiments of the present disclosure.
Figure 16A:
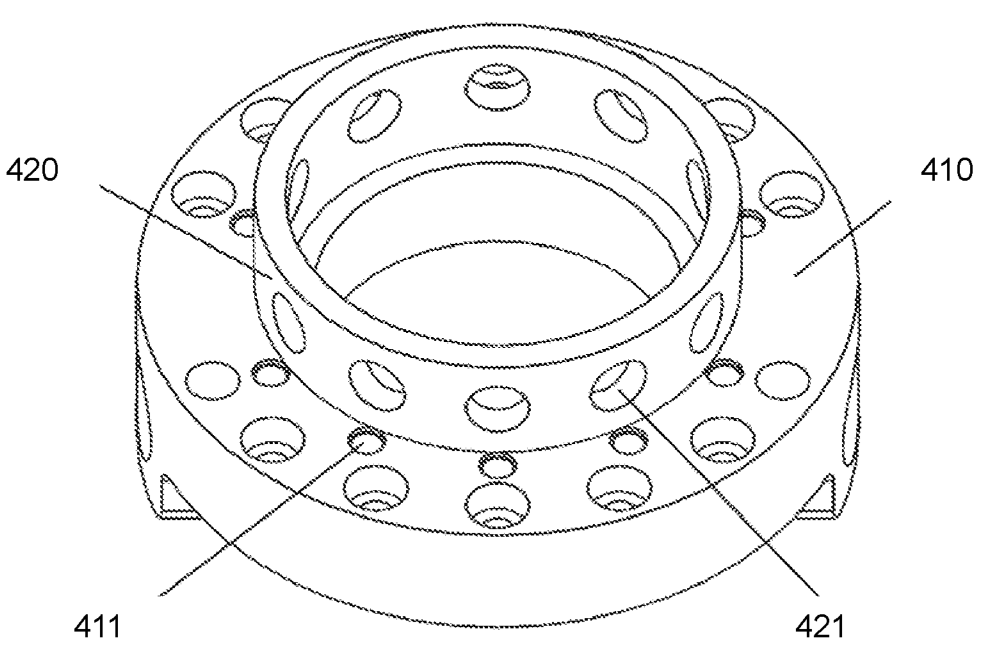
FIG. 16A is a schematic diagram illustrating a structure of a connection structure of a robotic arm according to some embodiments of the present disclosure.
Figure 16B:
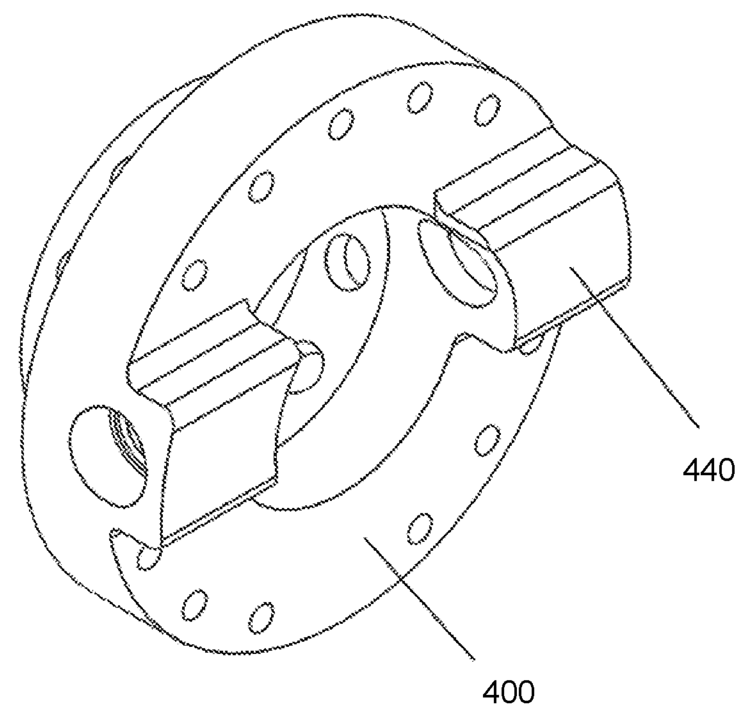
FIG. 16B is a schematic diagram illustrating a structure of a connection structure of a robotic arm according to some embodiments of the present disclosure.
Figure 17A:
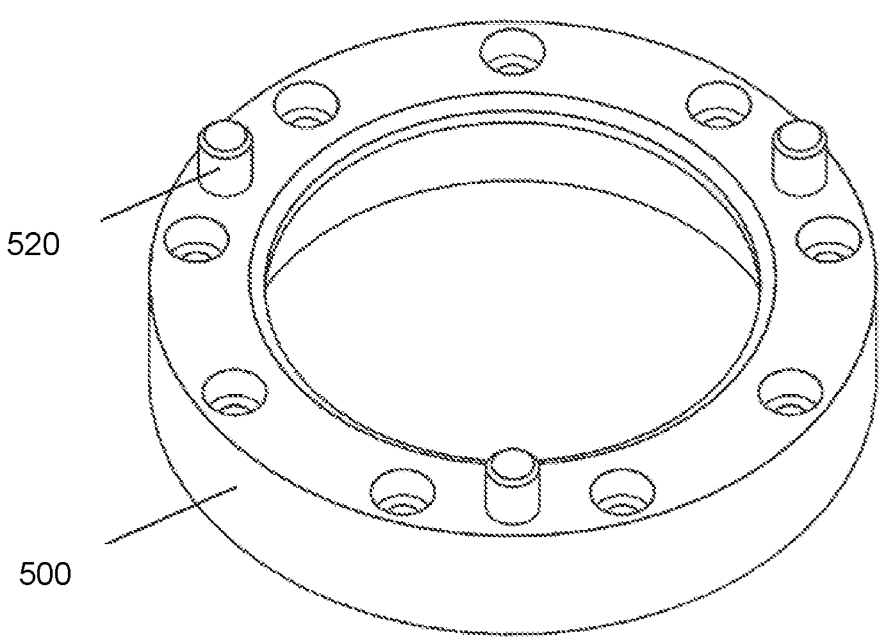
FIG. 17A is a schematic diagram illustrating a structure of a replacement part according to some embodiments of the present disclosure.
Figure 17B:
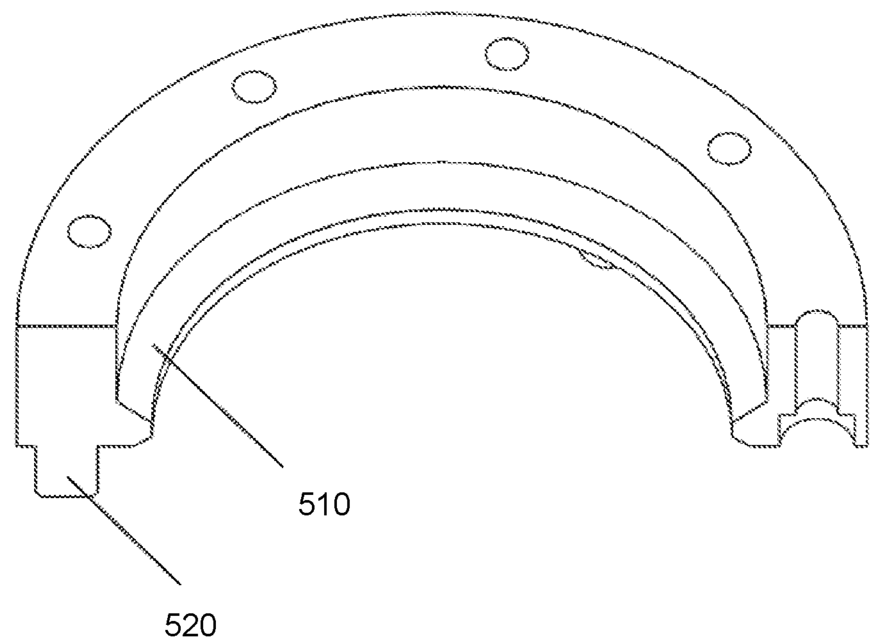
FIG. 17B is a cross-sectional view of a replacement part according to some embodiments of the present disclosure.

FIG. 11 is a schematic diagram illustrating a structure of a quick change device at an end of a robot according to some embodiments of the present disclosure; FIG. 12 is a schematic diagram illustrating a structure of a quick change device at an end of a robot according to some embodiments of the present disclosure; FIG. 13 is a cross-sectional view of a quick change device at an end of a robot in a locked state according to some embodiments of the present disclosure; FIG. 14 is a cross-sectional view of a quick change device at an end of a robot in a released state according to some embodiments of the present disclosure; FIG. 15 is a cross-sectional view of a quick change device at an end of a robot in an intermediate state according to some embodiments of the present disclosure; FIG. 16A is a schematic diagram illustrating a structure of a connection structure of a robotic arm according to some embodiments of the present disclosure; FIG. 16B is a schematic diagram illustrating a structure of a connection structure of a robotic arm according to some embodiments of the present disclosure; FIG. 17A is a schematic diagram illustrating a structure of a replacement part according to some embodiments of the present disclosure; and FIG. 17B is a cross-sectional view of a replacement part according to some embodiments of the present disclosure.

Please refer to FIG. 11 to FIG. 17, the embodiments of the present disclosure provide a quick change device at an end of a robot (or referred to as a quick change interface for a joint of a robotic arm). In some embodiments, the quick change device at the end of the robot may include a body part 400 (or referred to as a body side connector), a replacement part 500 (or referred to as a replacement side connector), and a driving locking part 600 (or referred to as a driving locking device). In some embodiments, the body part 400 may be mounted on an end of the robotic arm, and the replacement part 500 may be mounted on a replaceable actuator and may be detachably connected to the body part 400. The driving locking part 600 is used to lock the body part 400 with the replacement part 500. In some embodiments, the driving locking part 600 (or referred to as a driving locking device) may include a driving assembly and a locking assembly. In some embodiments, the driving assembly may include a cam mechanism. The cam mechanism is rotationally connected to the body part 400 (or referred to as the body side connector). In some embodiments, the locking assembly may be movably connected to the body part 400 (or referred to as the body side connector), and the locking assembly may include a locked state and a released state. The cam mechanism may abut against the locking assembly, and a rotation of the cam mechanism may drive the locking assembly to move, so that the locking assembly may switch between the locked state and the released state. In some embodiments, the locking assembly may include a push rod 610 and at least one locking component 630.

In some embodiments, the driving locking part 600 may include the push rod 610 and the cam mechanism. The push rod 610 is movably set in the body part 400. The push rod 610 has two positions, namely a locked position and an unlocked position, which is used to implement a detachably connection between the body part 400 and the replacement part 500. When the push rod 610 is in the locked position, the locking assembly is in the locked state; when the push rod 610 is in the unlocked position, the locking assembly is in the released state. The cam mechanism may be mounted on the body part 400 for driving the push rod 610 to move. When the push rod 610 moves from the unlocked position to the locked position, the body part 400 is locked with the replacement part 500, so that a replaced actuator may be connected to the robot for use. When the push rod 610 moves from the locked position to the unlocked position, the replacement part 500 is detachable from the body part 400, and the actuator may be replaced.

In some embodiments, the cam mechanism includes a cam 621. A shape of the cam 621 is designed such that when the push rod 610 is in the locked position, a normal of the contact surface between the push rod 610 and the cam 621 passes through a rotation center of the cam 621. In this way, when the push rod 610 is in the locked position, a direction of a resultant force applied to the cam 621 is perpendicular to a circumferential surface of the cam 621 and points to the rotation center of the cam 621, so that the cam 621 and the push rod 610 are in contact by a friction with no rotation, thereby implementing a self-locking.

In some embodiments, the driving locking part 600 further includes at least one locking part 630. When the push rod 610 moves from the unlocked position to the locked position, it may simultaneously drive the locking part 630 to move, so that the body part 400 and the replacement part 500 may be connected, and the body part 400 may drive the replacement part 500 to move.

In some embodiments, a first slope 611 is formed on a side surface of the push rod 610, and a second slope 510 facing toward the first slope 611 is formed on an inner wall of the replacement part 500, the locking component 630 is arranged between the first slope 611 and the second slope 510. When the push rod 610 moves from the unlocked position to the locked position, the first slope 611 pushes the locking component 630 to move towards the second slope 510, until the locking component 630 closely abuts against the first slope 611, the second slope 510 and the body part, so as to implement a fixed locking between the body part 400 and the replacement part 500.

In some embodiments, in order to make the connection stronger and to make an action of force between the body part 400 and the replacement part 500 more uniform and more balanced, both the first slope 611 and the second slope 510 may be set as annular taper surfaces, and the body part 400 may include a body structure 410 and a connection structure 420. The connection structure 420 is disposed on an end surface of the body structure 410 near the replacement part 500 around the push rod 610. In some embodiments, the connection structure 420 may be annular (such as a circular shape), and a plurality of holes (such as holes 421) are symmetrically opened on the connection structure 420. In this embodiment, the locking component 630 may be a steel ball, there are a plurality of locking components arranged in a one-to-one correspondence with the holes 421, and the locking components 630 may pass through the holes driven by the first slope 611. The first slope 611 and the second slope 510 are respectively disposed on two sides of the connection structure 420, and both face toward the holes 421. In this way, under a pushing action of the first slope 611 and the second slope 510, the steel ball, that is, the locking component 630 may pass through the hole 421 for a reciprocating movement. In some embodiments, the locking component 630 may have other shapes than spherical shape. For example, the locking component 630 may be in a cylinder shape, an ellipsoid shape, etc. In this case, the hole 421 on the connection structure 420 may be set in a shape corresponding to the locking component 630 (such as a rectangular hole, an oval hole, etc.). In some embodiments, the first slope 611 and/or the second slope 510 may be set in other shapes. For example, the first slope 611 and/or the second slope 510 may be a plurality of sector-shaped taper surfaces arranged at intervals.

In some embodiments, when the push rod 610 moves from the unlocked position to the locked position, the push rod 610 moves toward the replacement part 500, and the first slope 611 pushes the steel ball through the hole 421 to move toward the outside. As the steel ball also abuts against the second slope 510 in the locked state, during the outward movement, a pushing force perpendicular to the second slope 510 may be applied on the second slope 510, and the pushing force may be decomposed into two component forces in a radial direction and in a direction toward the body part 400. As the second slope 510 is an annular taper surface and the steel balls are distributed symmetrically, the component forces generated by the steel balls in the radial direction cancel each other out, and only the component force towards the body part 400 remains, which pushes the replacement part 500 towards the body part 400, and presses the replacement part 500 and the body part 400 tightly, so that the replacement part 500 and the body part 400 are firmly connected.

When the replacement part 500 needs to be replaced, the push rod 610 is moved from the locked position to the unlocked position, and then the replacement part 500 is driven to separate from the body part 400 (or the replacement part may be automatically disengaged based on gravity). During this movement, the second slope 510 pushes the steel ball through the hole 421 inward, so that the replacement part 500 may be separated from the body part 400.

In some embodiments, in order to facilitate the separation, the driving locking part 600 further includes a return spring 640. One end of the return spring 640 abuts against the replacement part 500, and the other end abuts against the push rod 610. When the push rod 610 is moved from the unlocked position to the locked position, the return spring 640 is compressed. When disengaged, an elastic force of the return spring 640 is released, pushing the push rod 610 back from the locked position to the unlocked position.

In some embodiments, the body structure 410 may have a plurality of plunger holes 411 facing the replacement part 500, and the plunger holes 411 are in a one-to-one correspondence with the holes 421. The body part 400 further includes a plurality of plungers 430, and the plungers 430 are elastic. One ends of the pluggers are inserted into the plunger holes 411, respectively, and the other ends extend out of the plunger holes 411, respectively and correspond to the holes 421 one by one. When the replacement part 500 is connected and locked with the body part 400, the replacement part 500 presses the plungers 430 into the plunger holes 411. When the replacement part 500 is separated from the body part 400, the plungers 430 pop out and at least partially block the holes 421, preventing the locking components 630 (e.g., steel balls) from falling out of the circular holes 421.

In this embodiment, the movement of the push rod 610 from the unlocked position to the locked position is driven by the cam 621, and distances between different places of the surface of the cam 621 and the rotation center are different, so when the cam 621 rotates, it may drive the push rod 610 to move.

In some embodiments, a positioning boss 440 is formed on the end surface of the body part 400 away from the replacement part 500, and an axle hole is opened on the positioning boss 440. The cam mechanism further includes a cam rotation axle 622, which is fixedly connected to the cam 621 and inserted into the axle hole to be rotationally connected to the axle hole.

In some embodiments, the cam mechanism further includes a rotation handle 623 for a working person to rotate the cam 621 conveniently. The cam rotation axle 622 is fixedly connected to the rotation handle 623 through the axle hole, and the rotation handle 623 may drive the cam 621 to rotate through the cam rotation axle 622 and drive the push rod 610 to move. In some embodiments, for more stability, the cam 621 may be fixedly connected to a middle of the cam rotation axle 622, and the rotation handle 623 may be fixedly connected to both ends of the cam rotation axle 622. In some embodiments, the rotation handle 623 and the two ends of the cam rotation axle 622 may transmit a torque through a rectangular, and an axial positioning of the rotation handle 623 may be completed through a set screw. In some embodiments, the cam 621 and the cam rotation axle 622 may cooperate to transmit the torque, and the axial positioning of the cam may be accomplished by the set screw and an axle step of the cam rotation axle 622.

In some embodiments, in order to facilitate installation, a positioning column 520 is formed on the end surface of the replacement part 500 facing the body part 400, and a positioning hole 412 is correspondingly formed on the end surface of the body structure 410 facing the replacement part 500. The positioning column 520 and the positioning hole 412 is mated and plugged so that the replacement part 500 and the body part 400 may be quickly positioned and mated. When the device is used, firstly, the replacement part 500 is connected to the body part 400, so that the replacement part 500 is in contact with the body structure 410 and the plunger 430 is pressed into the plunger hole 411. Then the rotation handle 623 may be rotated, that is, the rotation handle 623 may be rotated clockwise from the position shown in FIG. 14 to the position shown in FIG. 13. The rotation handle 623 drives the cam 621 to rotate, and the push rod 610 is driven to move from the unlocked position to the locked position. During this process, the first slope 611 of the push rod 610 is tangent to a slope of the locking component 630, that is, the steel ball. The steel ball is pushed to move outward through the hole 421 and presses the second slope 510, and at the same time compresses the return spring 640. A resultant force of the pressure applied by the return spring 640 and each steel ball on the push rod 610 is towards the body part 400. As the normal of the contact surface between the cam 621 and the push rod 610 passes through the rotation center of the cam rotation axle 622 at this time, the force does not produce any torque on the cam 621, and the cam 621 is in the self-locking state.

When needing replacement, the rotation handle 623 may be rotated counterclockwise (as seen from the perspective of FIG. 14). The rotation handle 623 may be driven to move by a mechanical device such as a motor, or may be manually driven. The movement may be transmitted to the cam 621 through the cam rotation axle 622. Due to an axial pressure of the steel ball and the push rod 610 and the pushing force of the return spring 640, the push rod 610 moves axially with the rotation of the cam 621. At the same time, the steel ball moves radially inward in the hole 421. At this moment, the push rod 610 is in contact with a position having the minimum distance with the cam rotation axle 622 on the cam 621. As the steel ball has shrunk in the radial direction, the replacement part 500 may be removed, and at the same time, the plunger 430 is stretched out to a designated position to mate with the round hole 421 to prevent the steel ball from falling. When a new replacement part 500 is mounted, the rotation handle 623 is rotated clockwise, and the push rod 610 moves axially under the action of the cam 621 and pushes the steel ball radially through the first slope 611. At the same time, the steel ball is pressed on the second slope 510 to move axially, finally implementing the locked state shown in FIG. 13.

The embodiments of the present disclosure also relate to a robotic arm, including a robotic arm body, a replacement end, and the quick change interface for the joint of the robotic arm described in any embodiment of the present disclosure. In some embodiments, the body part 400 may be detachably connected to the end of the robotic arm body, and the replacement part 500 may be detachably connected to the replacement end. In some embodiments, the robotic arm may be applied to a puncture surgery robot, and the replacement end may be a puncture end.

The quick change device at an end of a robot according to the embodiments of the present disclosure may have the following beneficial effects: a locking driving mode of the quick change device at an end of a robot is manual, and as there are no driving devices and additional devices such as cylinders and motors, the entire device volume (especially an axial length) as well as the weight are greatly reduced, so as to avoid the deformation of the robotic arm caused by the excessive weight of the end. It is very suitable for occasions that require high rigidity of the entire robotic arm in high movement precision such as puncture surgery robots. At the same time, the quick change interface is small in size, light in weight, and has a large carrying capacity, which enables the puncture robot's puncture end to be inserted into a scanning hole of a CT machine. In addition, an annular steel ball layout is adopted, and the contact mode is point contact, so a resistance in the locking process is smaller, a tolerance performance is higher, and the bearing capability is guaranteed. For example, it can effectively bear a puncture force generated when the puncture robot punctures. The plunger is used to prevent the steel ball from falling, and the friction force of the steel ball moving in the hole is smaller.

In some embodiments, the driving assembly may include the cam mechanism and the driving mechanism, and the driving mechanism may be used to drive the cam mechanism to rotate and form the self-lock with the cam mechanism when the locking assembly is in the locked state. In some embodiments, the driving mechanism may include the rotation handle. In some embodiments, the driving mechanism may include the motor driving mechanism (such as the servo motor, the geared motor, etc.), the hydraulic drive mechanism, the pneumatic drive mechanism, etc. In some embodiments, the motor driving mechanism may be directly connected to the axle of the cam to drive the cam to rotate or stop. In some embodiments, the motor driving mechanism may be connected to the cam through the cam rotation axle 622, so that the rotation axle drives the cam to rotate or stop.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of the present disclosure are not necessarily all referring to the same embodiment. Furthermore, the particular features, structures, or characteristics may be combined as suitable in one or more embodiments of the present disclosure.

In the same way, it should be noted that in order to simplify the expression disclosed in the present disclosure and help the understanding of one or more embodiments of the present disclosure, in the foregoing description of the embodiments of the present disclosure, sometimes multiple features are combined into one embodiment, drawings or descriptions thereof. This method of disclosure, however, is not to be interpreted as reflecting an intention that the claimed subject matter requires more features than are expressly recited in each claim. Rather, claimed subject matter may lie in less than all features of a single foregoing disclosed embodiment.

In closing, it is to be understood that the embodiments of the application disclosed herein are illustrative of the principles of the embodiments of the application. Other deformations are also possible within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A quick change interface for a joint of a robotic arm, comprising a body side connector, a replacement side connector, and a driving locking device, the driving locking device being movably arranged on the body side connector to drive the body side connector to lock or release from the replacement side connector; wherein the driving locking device includes a driving assembly and a locking assembly;

the driving assembly includes a cam mechanism, the cam mechanism being rotationally connected to the body side connector, and the cam mechanism including a cam;

the locking assembly is movably connected to the body side connector, and has a locked state and a released state;

the cam mechanism abuts against the locking assembly, and a rotation of the cam mechanism drives the locking assembly to move, so that the locking assembly switches between the locked state and the released state; wherein the driving assembly further includes a link mechanism which is rotationally and eccentrically connected to the cam mechanism, and the locking assembly includes at least one taper pin moving assembly, the link mechanism including a handle and a connection rod;

when the locking assembly is in the locked state, an axis of the connection rod passes through a rotation axis of the handle; and a normal line of a contact surface of the cam that abuts against the locking assembly passes through a rotation center of the cam;

wherein the at least one taper pin moving assembly is slidably connected to the body side connector, the cam mechanism abuts against the taper pin moving assembly, the replacement side connector has a first taper surface, and the taper pin moving assembly has a second taper surface, the cam of the cam mechanism has a highest point, when the highest point abuts against the at least one taper pin moving assembly the first taper surface is mated with the second taper surface;

a rotation movement of the cam mechanism is converted into a linear movement of the at least one taper pin moving assembly, so that the second taper surface is mated with or separated from the first taper surface; when the first taper surface mates the second taper surface, the locking assembly is in the locked state, and the body side connector is locked with the replacement side connector; when the second taper surface is separated from the first taper surface, the locking assembly is in the released state, and the body side connector is separated from the replacement side connector;

the link mechanism includes a mounting plate, the mounting plate being detachably connected to the body side connector, the handle being rotationally connected to the mounting plate, one end of the connection rod being rotationally connected to the handle, and another end of the connection rod being rotationally connected to the cam mechanism;

each of the at least one taper pin moving assembly includes a taper pin body and a rolling bearing, the rolling bearing being mounted on the taper pin body, the cam mechanism abuts against the taper pin body through the rolling bearing, the second taper surface is formed on the taper pin body;

wherein the each of the at least one taper pin moving assembly further includes a return spring, one end of the return spring being fixedly connected to the taper pin body, and another end of the return spring being fixedly connected to the body side connector;

when the taper pin body is separated from the replacement side connector, the cam mechanism rotates, and the return spring starts resetting; and a restoring force of the return spring separates the taper pin body from the replacement side connector.

2. The quick change interface for the joint of the robotic arm of claim 1, wherein the cam of the cam mechanism has a plurality of surface protrusion structures evenly distributed along a circumferential direction of the cam, a number of the at least one taper pin moving assembly is the same as a number of the surface protrusion structures, and there are a plurality of the taper pin moving assemblies uniformly set around an axis of the body side connector on an end surface of the body side connector.

3. The quick change interface for the joint of the robotic arm of claim 2, wherein the cam of the cam mechanism has a highest point, when the highest point abuts against the at least one taper pin moving assembly, the first taper surface is mated with the second taper surface.

4. The quick change interface for the joint of the robotic arm of claim 2, wherein the body side connector includes a connector body and a positioning rod, the positioning rod is fixedly connected to the connector body, the cam mechanism is sleeved on the positioning rod and is able to rotate around the positioning rod, the connector body is provided with a link mechanism placement cavity, a spring placement chamber and a first bolt hole, the connector body also has a first positioning boss, the first positioning boss and the first bolt hole are both used to connect with a robotic arm body.

5. The quick change interface for the joint of the robotic arm of claim 4, wherein the body side connector further includes an assembly ring, the assembly ring being detachably connected to the connector body, and limiting the at least one taper pin moving assembly between the assembly ring and the connector body; a reserved cavity adapted to a shape of the at least one taper pin moving assembly is opened on the assembly ring, the reserved cavity being used to provide a moving space for the at least one taper pin moving assembly; a second positioning boss for mating with the replacement side connector is opened on the assembly ring.

6. The quick change interface for the joint of the robotic arm of claim 5, wherein a positioning hole and a second bolt hole are provided on the replacement side connector, and a third positioning boss is also formed on the replacement side connector, the third positioning boss and the second bolt hole are connected with a replacement end, the positioning hole corresponds to the second positioning boss, and the positioning hole is used to implement a positioning of the replacement side connector and the assembly ring.

7. The quick change interface for the joint of the robotic arm of claim 5, wherein a positioning hole and a second bolt hole are opened on the replacement side connector, and a third positioning boss is formed on the replacement side connector, the third positioning boss and the second bolt hole being both used to mate with a replacement end; the positioning hole corresponds to the second positioning boss, and is used to position the replacement side connector and the assembly ring.

8. A robotic arm comprising a robotic arm body, a replacement end, and the quick change interface for the joint of the robotic arm of claim 1, wherein the body side connector is detachably connected to the robotic arm body, and the replacement side connector is detachably connected to the replacement end.

9. The quick change interface for the joint of the robotic arm of claim 1, wherein the driving assembly includes a manual drive assembly, the manual drive assembly drives each of the at least one taper pin moving assembly to perform the linear motion.

10. The quick change interface for the joint of the robotic arm of claim 1, wherein the handle is an L-shaped handle with a handle part and a connection rod part, a rotation of the handle part drives the connection rod part to rotate, and the connection rod part is rotationally connected to the connection rod.

11. The quick change interface for the joint of the robotic arm of claim 10, wherein a length of the connection rod part is shorter than a length of the handle part.

12. The quick change interface for the joint of the robotic arm of claim 1, wherein the link mechanism further includes a first bearing assembly and a second bearing assembly, the first bearing assembly is used to realize the connection between the handle and the mounting plate, and the second bearing assembly is used to realize the connection between the connection rod and the cam mechanism.

* * * * *